US010968676B2

(12) United States Patent
Buescher et al.

(10) Patent No.: US 10,968,676 B2
(45) Date of Patent: Apr. 6, 2021

(54) MOVABLE BARRIER APPARATUS AND METHODS FOR RESPONDING TO BARRIER TRAVEL OBSTRUCTIONS AND ABNORMALITIES

(71) Applicant: GMI Holdings, Inc., Mount Hope, OH (US)

(72) Inventors: Brent Buescher, Wooster, OH (US); Mike Dragomier, North Canton, OH (US); Robert E. Thomas, Jr., Flower Mound, TX (US)

(73) Assignee: GMI Holdings, Inc., Mount Hope, OH (US)

( * ) Notice: Subject to any disclaimer, the term of this patent is extended or adjusted under 35 U.S.C. 154(b) by 0 days.

(21) Appl. No.: 16/392,214

(22) Filed: Apr. 23, 2019

(65) Prior Publication Data

US 2019/0323279 A1   Oct. 24, 2019

Related U.S. Application Data

(60) Provisional application No. 62/662,136, filed on Apr. 24, 2018, provisional application No. 62/818,354, filed on Mar. 14, 2019.

(51) Int. Cl.
| | |
|---|---|
| *H02P 21/18* | (2016.01) |
| *H02P 3/06* | (2006.01) |
| *H02P 21/14* | (2016.01) |
| *E05F 15/44* | (2015.01) |
| *E05F 15/668* | (2015.01) |
| *H02H 7/085* | (2006.01) |
| *E05F 15/42* | (2015.01) |

(52) U.S. Cl.
CPC ............ *E05F 15/44* (2015.01); *E05F 15/668* (2015.01); *H02H 7/0851* (2013.01); *H02P 3/06* (2013.01); *H02P 21/14* (2013.01); *H02P 21/18* (2016.02); *E05F 2015/487* (2015.01); *E05Y 2900/106* (2013.01)

(58) Field of Classification Search
CPC ......... E05F 15/44; E05F 15/668; H02P 21/18; H02P 3/06; H02P 21/14; H02H 7/0851
USPC ....................................................... 318/266
See application file for complete search history.

(56) References Cited

U.S. PATENT DOCUMENTS

| | | | | |
|---|---|---|---|---|
| 3,621,354 A | * | 11/1971 | Fawcett | ................... G05D 3/20 |
| | | | | 388/815 |
| 4,245,298 A | * | 1/1981 | Slater | ................... G05B 19/253 |
| | | | | 318/604 |
| 5,245,264 A | * | 9/1993 | Helgren | ............... G05B 19/404 |
| | | | | 318/568.22 |

(Continued)

Primary Examiner — Kawing Chan
(74) Attorney, Agent, or Firm — Haynes and Boone, LLP

(57) ABSTRACT

Movable barrier monitoring apparatus and methods are provided for rapidly responding to barrier travel obstructions and other abnormal occurrences to cause the movable barrier operator to halt barrier travel or stop and reverse barrier travel, while ignoring typical and normal impediments to barrier travel. Alternate methods are described for programming the barrier operator controller to compare characteristics of the monitored barrier run over the defined travel path with the characteristics of a good barrier run without interruption to barrier travel, with the degree of differentiation of such characteristics determinative of whether the operator controller is to interrupt barrier travel or not.

10 Claims, 21 Drawing Sheets

(56) References Cited

U.S. PATENT DOCUMENTS

| | | | |
|---|---|---|---|
| 5,575,085 A * | | 11/1996 | Groombridge ......... C10B 33/12 110/101 C |
| 5,743,046 A | | 4/1998 | Siegler et al. |
| 5,770,934 A | | 6/1998 | Theile |
| 5,803,149 A | | 9/1998 | Halley et al. |
| 5,869,940 A | | 2/1999 | Parsadayan |
| 5,929,580 A | | 7/1999 | Mullet et al. |
| 6,034,497 A | | 3/2000 | Tamagawa et al. |
| 6,107,765 A | | 8/2000 | Fitzgibbon et al. |
| 6,246,196 B1 | | 6/2001 | Fitzgibbon et al. |
| 6,326,751 B1 | | 12/2001 | Mullet et al. |
| 6,528,961 B1 | | 3/2003 | Fitzgibbon et al. |
| 6,657,409 B1 | | 12/2003 | Leivenzon et al. |
| 6,667,591 B2 | | 12/2003 | Mullet et al. |
| 6,683,431 B2 | | 1/2004 | Fitzgibbon et al. |
| 6,696,806 B2 | | 2/2004 | Study et al. |
| 6,741,052 B2 | | 5/2004 | Fitzgibbon |
| 6,744,231 B2 | | 6/2004 | Fitzgibbon et al. |
| 6,782,662 B2 | | 8/2004 | McCartney et al. |
| 6,806,665 B2 | | 10/2004 | Fitzgibbon et al. |
| 6,847,178 B2 | | 1/2005 | Fitzgibbon |
| 6,870,334 B2 | | 3/2005 | Jurado et al. |
| 6,873,127 B2 | | 3/2005 | Murray |
| 6,897,630 B2 | | 5/2005 | Murray et al. |
| 6,940,240 B2 | | 9/2005 | Kelkhoff et al. |
| 6,989,767 B2 | | 1/2006 | Fitzgibbon et al. |
| 6,995,533 B2 | | 2/2006 | Fitzgibbon et al. |
| 7,017,302 B2 | | 3/2006 | Brookbank et al. |
| 7,019,478 B2 | | 3/2006 | Gregori et al. |
| 7,034,486 B1 | | 4/2006 | McMahon |
| 7,034,487 B1 | | 4/2006 | Murphy et al. |
| 7,075,256 B2 | | 7/2006 | Murray |
| 7,116,072 B1 | | 10/2006 | Murray et al. |
| 7,119,509 B1 | | 10/2006 | Keller et al. |
| 7,127,847 B2 | | 10/2006 | Fitzgibbon et al. |
| 7,132,813 B2 | | 11/2006 | Gregori et al. |
| 7,154,377 B2 | | 12/2006 | Gregori |
| 7,173,389 B1 | | 2/2007 | Gagnon |
| 7,180,260 B2 | | 2/2007 | Murphy et al. |
| 7,298,107 B2 | | 11/2007 | McMahon |
| RE40,001 E | | 1/2008 | Siegler et al. |
| 7,339,336 B2 | | 3/2008 | Gregori |
| 7,405,530 B2 | | 7/2008 | Keller, Jr. |
| 7,679,301 B2 | | 3/2010 | Gregori et al. |
| 7,805,977 B2 | | 10/2010 | Study |
| 8,122,645 B2 | | 2/2012 | Theile et al. |
| 8,813,429 B2 | | 8/2014 | Skotty |
| 9,051,768 B2 | | 6/2015 | Krupke et al. |
| 9,103,149 B2 | | 8/2015 | Skotty |
| 9,217,283 B2 | | 12/2015 | Olmsted |
| 2003/0193304 A1 | | 10/2003 | Fitzgibbon |
| 2004/0249513 A1 | | 12/2004 | Anderson et al. |
| 2004/0261317 A1 | | 12/2004 | Murray |
| 2005/0082998 A1 | | 4/2005 | Gregori et al. |
| 2005/0122076 A1 * | | 6/2005 | Patchell ................. E05F 15/40 318/280 |
| 2005/0156547 A1 | | 7/2005 | Gregori |
| 2006/0138987 A1 | | 6/2006 | McMahon |
| 2007/0001637 A1 | | 1/2007 | Murphy et al. |
| 2020/0368837 A1 * | | 11/2020 | Inoue ..................... B23H 7/104 |

* cited by examiner

MOVABLE BARRIER APPARATUS AND METHODS FOR RESPONDING TO BARRIER TRAVEL OBSTRUCTIONS AND ABNORMALITIES

CROSS REFERENCE TO RELATED APPLICATIONS

This non-provisional patent application claims the benefit of and priority to U.S. Provisional Patent Application No. 62/662,136, filed Apr. 24, 2018, and entitled "CORRELATION BETWEEN FORCE PROFILE PATTERNS IN MOVABLE BARRIER OPENER SYSTEMS" and pending U.S. Provisional Patent Application No. 62/818,354, filed Mar. 14, 2019, and entitled "SLACK CABLE DETECTION IN MOVABLE BARRIER OPENER SYSTEMS" both of which are hereby incorporated by reference in their entirety for all purposes.

TECHNICAL FIELD

The present invention relates generally to movable barrier opener systems for opening and closing garage doors, gates, and like movable barriers, and relates in particular to new and improved monitoring apparatus and methods for rapidly responding to only barrier travel obstructions or other abnormal occurrences.

BACKGROUND

Upward acting sectional or single panel garage doors, roll-up doors, gates, and other types of powered movable barriers utilize movable barrier opener systems for effecting the requisite control over the opening, closing and other movement of the barriers. A typical movable barrier opener system comprises a movable barrier operator and motor and motor drive assembly imparting movement to the barrier. The operation of the barrier opener system is typically controlled from (i) interior or exterior building mounted consoles, in wired or wireless communication with the movable barrier operator, (ii) proximately located hand held or vehicle mounted wireless transmitters, and (iii) remotely located network (e.g., Internet) access devices. Using such devices, barrier movement commands, typically code encrypted, are transmitted to the movable barrier operator, and in particular to the movable barrier operator's controller, the latter typically a microprocessor, microcontroller, or other type of programmable platform apparatus. The controller, inter alia, decrypts the received encrypted commands, and based thereon, instructs the motor, or other motion-imparting power source, to open, close, halt the travel of, or otherwise move, the movable barrier in accordance with the received commands. When the movable barrier is a garage door (the movable barrier opener system therefore referred to as a "garage door opener system" and the movable barrier operator therefore referred to as a "garage door operator"), the garage door operator controller must, in addition to its other tasks (i) assure that the force applied by the motor is sufficient to enable the garage door to uninterruptedly travel along its defined path (typically a tortious route), while at the same time (ii) assure that anomalous (i.e., abnormal) door travel conditions (such as animate or inanimate door obstructions, door imbalance or blockage, or like occurrences) will cause rapid interruption of the door travel (due to the stoppage, or stoppage and reversal, of the motor), while avoiding interruption of door travel due to the normal or typical encounters (e.g., guide rail irregularities, friction, scaling factors, or noise).

Thus, there currently exists in the industry the need for a more effective and reliable monitoring method that (i) is sufficiently sensitive and responsive to true movable barrier travel obstructions or other abnormal occurrences so as to rapidly interrupt the door travel before damage occurs, (ii) is not so overly sensitive to events that do not compel such interruption, and (iii) may be incorporated into the movable barrier operator controller.

While such an effective and reliable method is desired irrespective of the type of motor drive assembly that the movable barrier opener system employs, one type of motor drive assembly, referred to as a jack shaft drive assembly, is particularly in need of such method. As conventionally known, a jack shaft drive assembly is one in which, typically, the motor is directly coupled to a horizontally positioned shaft (i.e., the jack shaft) extending along the width of, and mounted above, the movable barrier, one or more cable drum(s) rigidly attached to the jack shaft. One or more cables are wound about the cable drum(s) with the free end of each cable connected to, and at the lower end of, the movable barrier. When the motor is actuated to open the door, the jack shaft and the cable drum(s) are consequently rotated in a direction so as to wind the cable(s) onto the cable drum(s), thereby lifting the movable barrier to its open position. When the motor is actuated to close the door, the jack shaft and the cable drum(s) are consequently rotated in an opposite direction so that the cable(s) may be payed out, thereby permitting the movable barrier to be closed by the combination of the restoring force provided by a torsion spring wound around the jack shaft and the unsupported portion of the weight of the movable barrier.

Not only does a jack shaft type drive assembly require reliable and accurate detection of, and immediate stoppage or reversal of the motor in response to, obstructions to door travel, but also immediate motor shut off in the presence of other abnormal occurrences not untypical of jack shaft drive assemblies. For example, whenever tension is removed from a cable, thereby causing the cable to unwrap or separate from a cable drum, the cable may then not relocate properly when tension is restored, and the movable barrier, for this or other reasons, may become undesirably stuck or jammed in a partially open or intermediate position, requiring manual repair work by a technician to correct the situation. The most common cause of this cable tension removal is when the motor rotates the cable drum but the movable barrier does not move. This may occur, for example, when the movable barrier is stuck in its opened position or an obstruction impedes its movement. Such conditions are particularly existent when the movable barrier (e.g., garage door) is one of the light weight variety. The automatic closing of any garage door inherently introduces vibrations, guide rail irregularities, noise, and other real-world energy dynamics into the process of movement of the door. In the case of a light weight door, these dynamics may cause variations in the inertial forces associated with the moving door that mimics that which occurs when the door becomes jammed or otherwise obstructed. This can make the discriminatory detection of only true obstructions or other serious abnormalities more difficult.

In summary, it is desired, particularly for relatively light weight movable barriers, to have movable barrier opener systems that employ monitoring apparatus and methods that (i) continuously provide sufficient, albeit varying, levels of force to uninterruptedly move the movable barrier along its designated route, while at the same time (ii) rapidly respond to only anomalous barrier travel conditions to effect motor stoppage in the event of true travel obstructions or other abnormal occurrences, and not in response to normal variations of barrier travel. Moreover, it is desired that such objectives be achieved independent of changes in environmental conditions, such as variations in ambient temperatures. The new and improved monitoring apparatus and methods of the present invention described herein accomplish these objectives.

SUMMARY

Accordingly, a first embodiment of the invention involves a new and improved method of movable barrier monitoring that is particularly useful when monitoring light weight garage doors and like movable barriers. This method, as incorporated or programmed into the controller of the movable barrier operator, broadly determines the difference (herein defined as "door position discrepancy") between (i) a current "movable barrier behavioral profile" generated during a presently monitored travel or "run" of the movable barrier between defined travel positions, and (ii) a good stored "movable barrier behavioral profile", representing a successful "run" of the movable barrier between essentially identical defined travel positions, without barrier travel interruption. This good profile can be provided as an initial factory setting or as generated by one (or more) prior successful run(s) of the movable barrier, without barrier travel interruption, and between the essentially identical defined travel positions.

The term "movable barrier behavioral profile", as used herein in the specification and claims, is defined as a set of data representative of one or more 'position factors' over at least a portion of travel of the movable barrier along its defined travel path. A "position factor", as used herein in the specification and claims, is defined as any factor (i) that is indicative, directly or indirectly, of the position of the movable barrier along its defined travel path, or (ii) by which the position of the movable barrier along its defined travel path can be determined. Thus, a "position factor" can be, for example, extent of motor torque, motor current, or motor shaft angular position, specific combinations of these, or the other examples described in this application. Therefore, a movable barrier behavioral profile may be a set of such representative data undergoing collection during a presently monitored "run" or a stored set of such data from one or more prior successful run(s).

In accordance with the method and apparatus of this first embodiment, the deviation of one or more position factors making up a movable barrier behavioral profile from an expected value is compared to a pre-set acceptable deviation criteria. The pre-set acceptable deviation criteria, for example, may be programmed into the controller, initially or as a consequence of an earlier good run, set by a user at the time of installation of the movable barrier opener, and/or set proportional to the movable barrier weight, mass, or other characteristic. So long as the deviation is within the pre-set acceptable deviation criteria, the movable barrier will travel along its defined path, without interruption. However, in the event of deviation of one or more of the position factors of the particular movable barrier behavior profile beyond the pre-set acceptable deviation criteria (therefore indicative of a true obstruction or other abnormality), immediate stoppage, or stoppage and reversal, of the motor (or other motion-imparting power source), and therefore of the movable barrier, occurs.

Thus, fluctuations or deviations, even severe fluctuations or deviations, of the monitored position factor do not compel motor (or barrier travel) interruption during the barrier's run, so long as such fluctuations or deviations are within the pre-set acceptable deviation criteria Rather, immediate stoppage, or stoppage and reversal, of the motor (and thus, barrier travel) is ultimately depends upon the door position discrepancy, i.e., the difference between the currently monitored movable barrier behavioral profile and a "good" door movable barrier behavioral profile exceeding the pre-set acceptable deviation criteria.

In accordance with a feature of the aforedescribed monitoring, the door position discrepancy can be determined when the respectively defined movable barrier travel paths are between the barrier's fully open and fully closed positions or, alternatively, during only select portions thereof (e.g., the last portion of the travel path, an intermediate portion of the travel path, or an initial portion of the travel path).

A second embodiment of the invention involves a new and improved force monitoring method incorporated or programmed into the controller of the movable barrier operator that automatically determines the degree of correlation, referred to herein as the "correlation coefficient", between (i) a "force factor" profile pattern generated by the currently monitored travel or "run" of the barrier between defined travel positions, and (ii) a "good" stored "force factor" profile pattern, provided either as a factory setting or generated by a prior successful run of the barrier, without barrier travel interruption, between essentially identical defined travel positions. By way of example, when the two profile patterns are identical, the correlation coefficient would be 1.0, with lesser degrees of correlation having correspondingly smaller coefficients in accordance with the computational methods of this process.

The "force factor", as defined herein, is any factor that relates, directly or indirectly, to the measure of force being supplied by the motor to move the movable barrier along its defined travel path. Thus, a force factor may be the measure of motor torque, motor current or motor speed, rate of change of motor current, back EMF, motor voltage, or like measures, as well as specific combinations of various ones of such factors. Thus, the term "force factor profile pattern", as used herein, shall mean either the profile pattern of the specific force factor representative of the measure of such motor force, or the force profile pattern itself resulting from use of the specific force factor.

The correlation coefficient, taken in conjunction with pre-set acceptable comparison criteria programmed into the controller, assures uninterrupted movable barrier travel for the currently monitored run so long as it is within the aforementioned pre-set acceptable comparison criteria, but also enables immediate stoppage, or stoppage and reversal, of the motor (or other motion-imparting power source), and therefore of the barrier travel, if the correlation coefficient does not meet (i.e., is below) the pre-set acceptable comparison criteria.

In accordance with a feature of this method of the invention, the correlation coefficient can be determined when both the "good" and currently monitored runs of the barrier are from fully open to fully closed or, alternatively, during only select portions thereof (e.g., the last portion of the travel path, an intermediate portion of the travel path, or an initial portion of the travel path).

Of note is that the monitored force factor does not compel motor (or barrier travel) interruption due to only fluctuations, even severe fluctuations, of the force factor during the run of the barrier but, rather, is instead based upon the lack of degree of correlation between the stored force factor profile pattern and the currently monitored force factor profile pattern.

Another feature of this monitoring method of the present invention, particularly as incorporated in the movable barrier operator controller, is the programmed selection of a pre-set acceptable comparison criteria between the compared force factor profile patterns, and hence, whether the barrier travel is, or is not, to be interrupted. In addition, alternate means are provided for computation of a system's correlation coefficient.

BRIEF DESCRIPTION OF THE DRAWINGS

Additional features of the new and improved methods and apparatus of the present invention will become readily understood from the following detailed written description, taken in conjunction with the appended drawings, in which.

DETAILED DESCRIPTION

Because the monitoring methods of the present invention have been found to have particular applicability when incorporated into a movable barrier system of the type employing a jack shaft type motor drive assembly, the following detailed description will be of a preferred embodiment of a garage door opener system incorporating such drive assembly for controlling the movement of the associated garage door. However, it is to be emphasized that the alternative monitoring methods of the present invention, as subsequently described, may be utilized and incorporated into movable barrier opener systems of any type, employing any type of drive assembly, for controlling the movement of any type of powered barrier.

Figure 1:
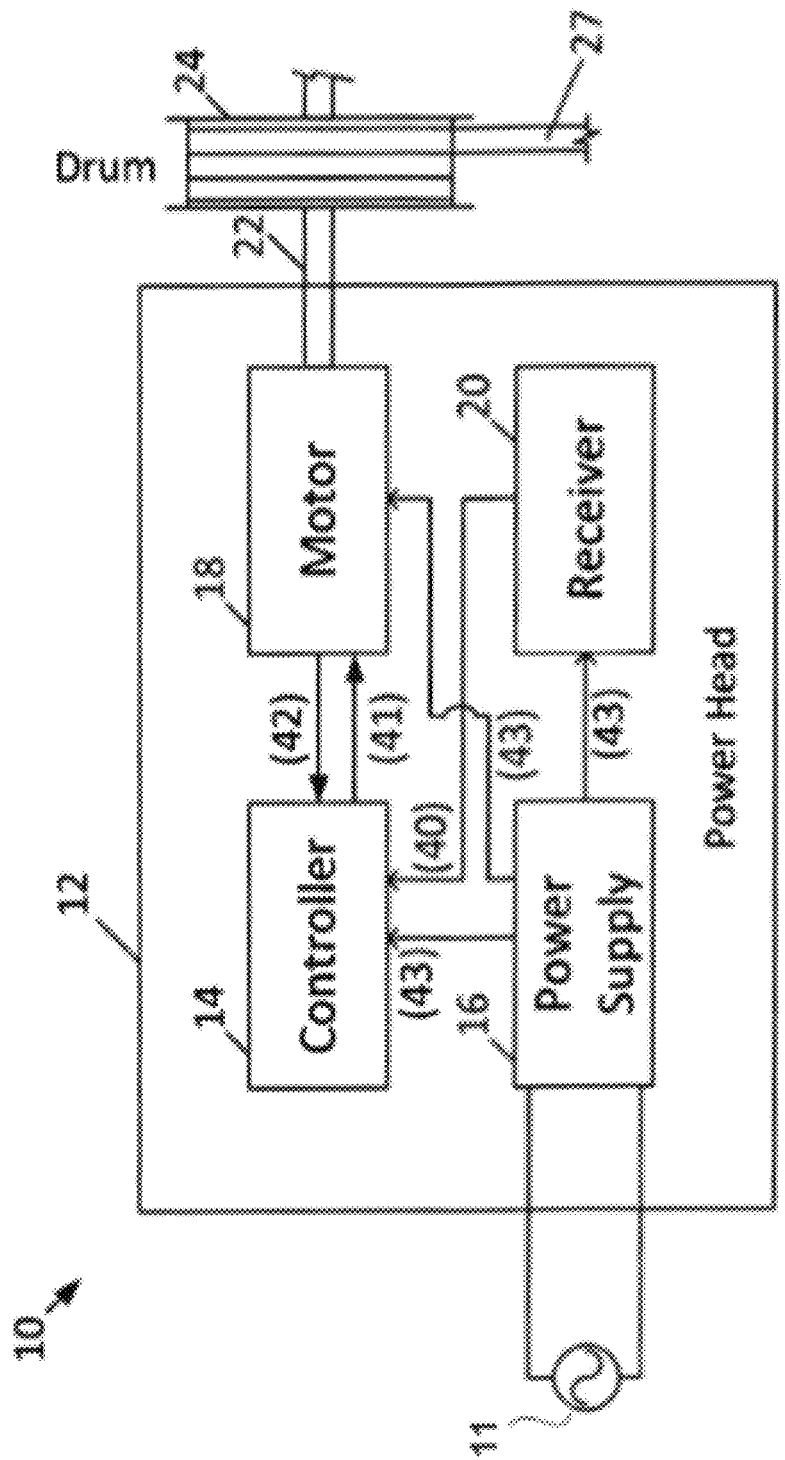
FIG. 1 is a functional block diagram of material portions of a movable barrier opener system employing a typical jack shaft motor drive assembly.

Therefore, with initial reference to FIG. 1, a jack shaft type garage door opener system 10 comprises, within power head 12, a garage door operator controller 14, DC motor 18, and receiver 20, DC power supply 16 providing power to those components through conductive pathways 43. The power supply 16 is typically fed from an external AC source 11, normally electrical mains.

Door movement commands (e.g., "open," "close," "halt") can be proximately transmitted from interior and exterior wired or wireless wall consoles (not depicted), as well as from hand-held or vehicle mounted wireless transmitters to receiver 20 where they routed to the door operator controller 14 via path 40. The controller 14 comprises any programmable platform apparatus, such as a programmable microprocessor or microcontroller for, in addition to carrying out the monitoring processing of the present invention, processing the incoming door movement commands to instruct operation of the motor 18 (via conductive path 41) to control movement of the motor 18 (and coupled motor drive assembly) in accordance with the incoming door movement commands.

Figure 2A:
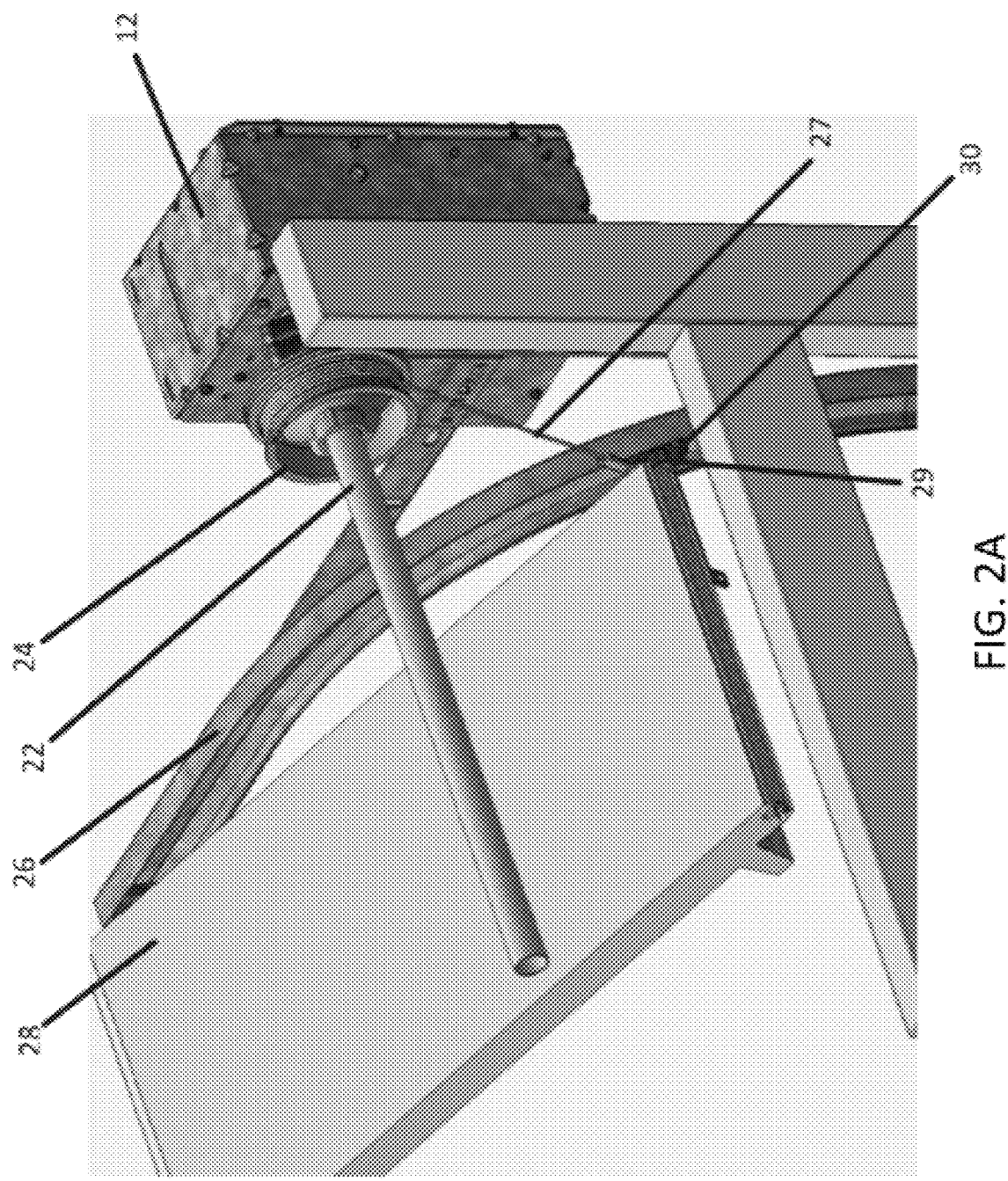
FIG. 2A is a pictorial view of material structural components of a jack shaft motor drive assembly for moving a single panel type garage door.
Figure 2B:
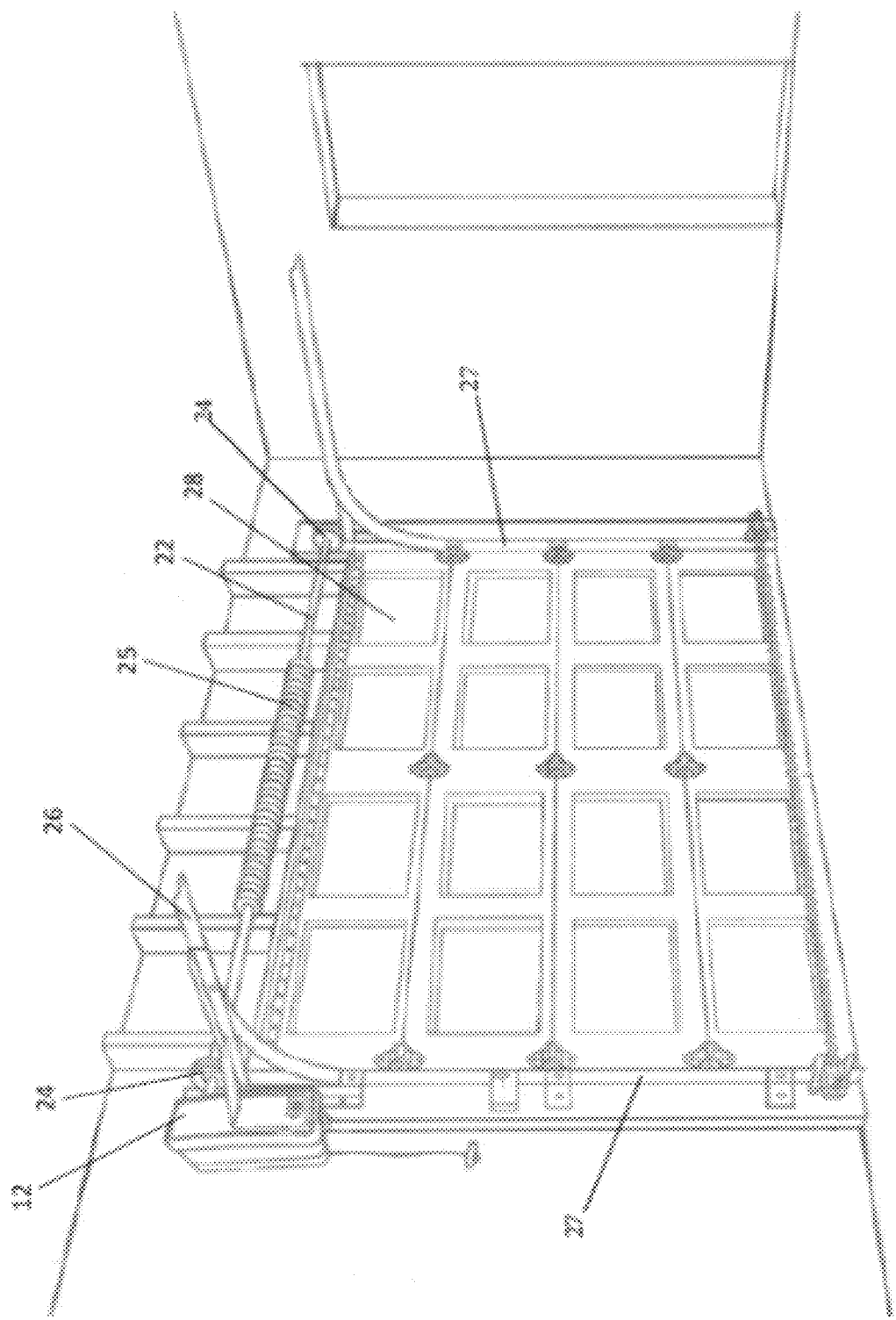
FIG. 2B is a perspective view of material structural components of a jack shaft motor drive assembly for moving an upward acting sectional type garage door.

As illustrated in FIGS. 1, 2A and 2B, the motor drive assembly in this preferred embodiment comprises a horizontally extending shaft 22 (i.e., the jack shaft) directly coupled to, and adapted to be rotatably driven by, motor 18 in either a clockwise or counterclockwise direction. A torsion spring 25 extends around jack shaft 22 (FIG. 2B). One or more cable drums 24 are rigidly connected to the jack shaft 22, with cables 27 wound about the cable drum(s) 24 with the free end of each cable connected to, at the lower portion of, the garage door 28.

FIG. 2A illustrates the garage door 28 as a conventional single panel door being moved between open and closed positions along guide rails 26, and FIG. 2B illustrates the garage door 28 as a conventional upward acting sectional door being moved between open and closed positions along guide rails 26. When motor 18 is instructed by controller 14 to open the door, the jack shaft 22 and connected cable drums 24 are rotated by the motor 18 in a direction so as to wind the cable(s) 27 onto the cable drum(s) 24, thereby lifting the garage door 28 to its open position. When the motor 18 is instructed by the controller 14 to close the door, the jack shaft 22 and connected cable drums 24 are rotated by the motor 18 in the opposite direction so that cable(s) 27 may be payed out, thereby permitting the door 28 to be closed, the torsion spring 25 providing a counterbalance to aid in the door 28 being moved to its closed position.

A. First Embodiment of Invention (Position Factor Comparison Approach)

In accordance with the first embodiment of the invention, the movable barrier operator controller 14 is configured and programmed to (i) monitor the particular chosen position factor that is indicative of the position of the movable barrier, here the garage door 28, and (ii) from such monitoring, determine whether the door position discrepancy, as previously defined, is, or is not, within the pre-set acceptable deviation criteria, during the travel of the garage door 28 along its defined travel path. For example, if motor current is chosen as the position factor, motor current being proportional to the extent of rotation of jack shaft 22, and therefore of the position of garage door 28, a suitable motor current sensor is positioned in operative relationship with motor 18 and controller 14. The controller 14, monitoring the motor current, then, pursuant to its programming, determines the door position discrepancy, namely the difference between the amount of motor current during the currently monitored run, or portion of the run, of the door 28 and that during, for example, a prior "good" run of the same run, or portion of the run. If such difference exceeds the pre-set acceptable deviation criteria, the controller halts (or halts and reverses) the motor, and therefore the travel of the door. If within such criteria, the controller 14 continues to operate the motor and move the door 28 along on its travel path. Therefore, by using this method of monitoring the particular position factor, and accurately setting the pre-set acceptable deviation criteria, the interruption of door travel is limited to only those situations in which the door position discrepancy is indicative of only a true obstruction or specific abnormal occurrence.

While this previously described monitoring method has been determined to be effective for typical movable barrier opener systems under most operational situations, challenges may still occur when the movable barrier or garage door is of the light weight variety and when the door is to be moved from its fully open position toward its fully closed position. This is because the "vertical weight" of a light weight door (i.e., the downward gravitational pull on the vertically hanging portion of the door as opposed to the portion lying horizontally at rest) and the corresponding counterbalancing spring force are so small. As a consequence, under such circumstances, detecting when such light weight door is jammed becomes more difficult than detecting when a heavier door is jammed.

Explaining differently, if one was to model a door with a linear spring and a linear force actuator, neglecting friction and the rotating portion, one has $$m\ddot{x} + \left(\frac{mg}{h} - k\right)x = F,$$

where F is the motor force, $$\frac{mg}{h}x$$

is the vertical weight of the door, kx is the spring force, and $m\ddot{x}$ is the resulting accelerating force experience by the door. On a light door, m is small, and $$\left(\frac{mg}{h} - k\right)x,$$

the open limit, is even smaller. On a well-balanced door, $$\left(\frac{mg}{h} - k\right)$$

is not large, and on a light, well-balanced door, it is even smaller, and in the open limit, x is a close to zero. Consequently, the whole static force becomes difficult to distinguish from extraneous factors such as normal friction and the dynamic forces of starting the motor and turning the jack shaft.

However, to overcome this challenge, and in accordance with a feature of this embodiment of the invention, during the movement of the door 28 from its open position toward its closed position, the controller 14 is programmed to periodically brake the motor by providing a momentary reversal pulse to the motor 18, the controller 14 then measuring the motor current drawn by motor 18 as a consequence of the momentary reversal pulse compared to the motor current drawn without such momentary reversal pulse. If the movable barrier 28 is jammed, the mechanical load presented by the door 28 is necessarily diminished. This diminishes the inertia of the combined moving mass of the system (motor 18, jack shaft 22, and door 28), the door 28 no longer mechanically loading the jack shaft 22. As such, the motor current drawn by the motor 18 and measured by the controller 14 as a consequence of the momentary reversal pulse is less than the motor current drawn by the motor 18 and measured by the controller 14 when the door 28 was still mechanically loading the jack shaft 22, the difference being outside of the pre-set acceptable deviation criteria. This then results in the controller stopping the motor 18, or more desirably stopping and reversing the motor 18, thereby responsively tightening the cables 27 and raising the jammed door 28 back toward its open position. Thus, by implementing these periodic momentary reversal pulses during the monitoring of the position factor, here motor current, in accordance with the method of this embodiment of the invention, the difference between a light weight moving door and one that is stuck or jammed can be detected.

The aforementioned description has been in the context of the position factor being motor current. However, other measures monitored by the controller 14 can be similarly be used to achieve the desired objectives. For example, the controller 14 may measure an elapsed time from the instant the controller 14 provided the momentary reversal pulse to the motor 18, to the instant that the motor current drawn by the motor 18 peaks in connection with such momentary reversal pulse compared to the time that the motor current peaks on a previous good run. Alternatively, the controller 14 may provide momentary reversal pulses at known intervals and the controller 14 may measure an elapsed time from the instant that the motor current drawn by the motor 18 peaks to a stored instant that the motor current peaked on previous good runs of the movable barrier 28.

A motor 18 under a relatively greater load (higher torque) will exhibit a particular delay (e.g., a "first delay" or a "loaded delay") between the instant that the momentary reversal pulse was provided to the motor 18 and the instant that the motor current peaks, whereas a motor 18 under a relatively lesser load (lower torque) will exhibit a different delay (e.g., a "second delay" or an "unloaded delay") between the instant that the momentary reversal pulse was provided to the motor 18 and the instant that the motor current peaks. Similarly, a known good run of a movable barrier 28 driven by the motor 18 without obstruction will include a motor current peak at a relatively later moment in time following the start of motor 18 movement or provision of a momentary reversal pulse (e.g., a "first delay" or a "loaded delay") than a motor 18 driving an obstructed movable barrier which will include a motor current peak at a relatively earlier moment in time following the start of motor 18 movement or provision of a momentary reversal pulse (e.g., a "second delay" or an "unloaded delay"). Because the first delay and the second delay have different lengths, the controller 14 may characterize the load condition of the motor 18 based on the magnitude of the first delay and the second delay and thus may determine whether the movable barrier is moving correctly or is jammed.

As another example, the chosen position factor may be the angular position of the output shaft of the motor. Thus, an encoder may be operatively coupled to the motor 18 and the controller 14 that provides the angular position of the motor shaft, the rotation of the motor shaft corresponding to the extent and direction of movement of the door 28. The encoder may provide periodic position pulses corresponding to the extent of angular movement of the shaft of the motor 18. By counting these pulses, the controller 14 may determine the position of the movable barrier. One type of suitable shaft encoder is an absolute position encoder that typically digitally determines the angles of two gears with different tooth counts, providing a fine and a coarse position reading that is combined to determine the absolute position of the shaft. However, a movable barrier may jam while the position of the shaft of the motor continues to change because the cable may come off of the drum 24 and the motor 18 may continue to rotate the jack shaft 22 while the jammed movable barrier unexpectedly fails to move.

By counting these periodic position pulses from the encoder or receiving the measured motor shaft position, the controller 14 may also associate an expected motor shaft position with each motor current peak when the controller 14 periodically brakes the moving motor 18 by providing a momentary reversal pulse to the motor 18. A motor 18 driving an obstructed movable barrier will include a motor current peak at a relatively earlier moment in time following the start of motor movement (e.g., closer in time to the provision of the momentary reversal pulse) and thus a relatively lesser position pulse count or lesser motor shaft position than a motor 18 driving an unobstructed movable barrier, which will include a motor current peak, at a relatively later moment in time following the start of motor movement (or provision of a momentary reversal pulse). Because the first delay and the second delay have different lengths, the controller 14 may characterize the load condition of the motor 18 based on the position of the shaft of the motor 18 as represented by the position pulse count or measured motor shaft position at the time of the motor current peak. When motor current peaks begin to occur uncharacteristically early, a movable barrier may be determined to have become jammed.

By characterizing the load condition of the motor 18 based on the position of the shaft of the motor 18 as represented by the position pulse count or measured motor shaft position at the time of the motor current peak, the controller 14 may detect the jammed state of the door 28 without needing to measure the difference of the time of momentary reversal pulse to the time of motor current peak. Instead, momentary reversal pulses may be provided at set known intervals, and the position pulse count or measured motor shaft position corresponding to the motor current peak that arises after the momentary reversal pulse will be measured.

In other words, regular, periodic momentary reversal pulses are provided, and rather than timing the duration between providing the pulse and recording a current peak, the controller 14 records the motor shaft position at the time of the current peak and compares to the motor shaft position at a time of a current peak recorded from a known unobstructed "good" run. Thus, the position pulse count or measured motor shaft position at the moment of the motor current peak may correspond to a scaled and offset value of the delay between providing the pulse and recording a current peak. As such, the position pulse count or measured motor shaft position may be a proxy measurement for a "loaded delay" for a motor 18 driving an unobstructed movable barrier and also may be a proxy measurement for the "unloaded delay" for a motor 18 driving an obstructed movable barrier.

As a further feature of this approach when the door may be of the light weight type, multiple momentary reversal pulses may be provided to the motor 18 in sequence and the difference in position pulse count or measured motor shaft position of the current monitored run with that of a known good run, or the delay between each momentary reversal pulse and the instant that the motor current peaks, can be summed for each momentary reversal pulse. This summation develops an accumulated position error over time. As multiple momentary reversal pulses are provided and multiple motor current peaks are observed, the fluctuations associated with a practical system and the variation and noise generated thereby cancel out and trends emerge.

In this manner, the accumulated error between the exhibited delay and the expected delay may be measured by the controller 14 to characterize the load condition of the motor. By comparing the accumulated error over a known number of reversal pulses, and comparing this accumulated error to a threshold, the controller 14 may determine if the motor 18 has become unloaded (e.g., the moving mass of the movable barrier 28 is no longer coupled to the motor 18 because the cable 27 between the jack shaft 22 and the door 28 has become slack). This indicates that the movable barrier 28 is jammed.

Thus, one may appreciate that the controller 14 may also identify that a movable barrier 28 is jammed by the controller 14 (i) measuring the motor current peak (as the position factor) arising in connection with a momentary reversal pulse and comparing the measured motor current to an expected value, (ii) measuring the delay (as the position factor) between the momentary reversal pulse and the motor current peak arising in connection with the momentary reversal pulse and comparing to an expected value, (iii) measuring the difference of the motor shaft position (as the position factor) associated with a motor current peak of the current run of the movable barrier with the motor shaft position associated with a motor current peak of a known "good run" of the movable barrier, (iv) comparing multiple measured delays between the momentary reversal pulse and the current peak arising in connection with each momentary reversal pulse and summing the multiple measured delays to generate an accumulated door position discrepancy over time, and (v) measuring and comparing multiple motor shaft positions connected with multiple motor current peaks, each from a corresponding one of multiple motor shaft positions connected with multiple motor current peaks of a known good run of the movable barrier 28 to generate an accumulated door position discrepancy over time. In each case, the position factor is compared to a programmed pre-set acceptable deviation criteria. If the position factor exceeds this criteria, the door is determined to be jammed.

In accordance with this described monitoring process, the controller 14 may compare the position factor with the pre-programmed pre-set acceptable deviation criteria. If the position factor is within the acceptable deviation criteria, then the controller 14 is configured to instruct the motor 18 to continue to move the door 28 along its defined travel path without any interruption of door travel. On the other hand, if the position factor, at any portion of the defined travel path, is (or becomes) not within the pre-set acceptable deviation criteria, the controller 14, therefore assessing that the movable barrier 28 has encountered a true travel obstruction or an abnormal occurrence such as a loss of tension in the cable 27, is configured to immediately respond by stopping, or stopping and reversing, the motor 18, and therefore the movable barrier 28.

In some situations, there may be variable pre-set acceptable deviation criteria programmed into the controller 14 for respectively different portions of the defined travel path, to allow for different forces to be applied to the movable barrier 28, or even for no restrictions on the force to be applied, such as at the beginning or the end of the travel path. Moreover, the sequence of momentary reversal pulses mentioned above may be confined to a subset of the travel path, such as at the beginning of the travel path.

Utilizing this embodiment of the monitoring method of the present invention that essentially compares the movable barrier behavioral profile of the current run with the movable barrier behavioral profile of a prior successful run, as opposed to an approach that is based solely upon the presence or absence of force spikes in the monitored movable barrier behavioral profile, not only reduces the number of needless door travel interruptions, but enables responses to abnormal occurrences that may not otherwise be identified.

In accordance with a feature of this described embodiment, the pre-set acceptable deviation criteria can be defined, for example, as a number in the range of 0% to 100% where a measured value such as the measured motor current, delay between a momentary reversal pulse and a current peak, and/or an accumulated door position discrepancy is compared to an expected value. 0% may indicate that the measured value is 0% of the expected value, and 100% may indicate that the measured value is 100% of the expected value. In various instances, the measured value and expected value are unsigned absolute values. This acceptable deviation criteria provides a mechanism for characterizing the similarity of the currently monitored movable barrier behavioral profile and the "good" stored movable barrier behavioral profile. If the pre-set acceptable deviation criteria is then programmed into the controller 14 to be less than a perfect match of the profiles, for example an 80% match, then the controller 14 causes the motor 18 to stop, or to stop and reverse, when the compared profiles fall outside the acceptable deviation criteria. Of course, the acceptable deviation criteria can be pre-set, higher or lower than 80%, depending upon the desired sensitivity, and can also be set at variable percentages depending upon the location(s) in the defined travel path, but 80% is used herein as merely an illustrative example.

Figure 3:
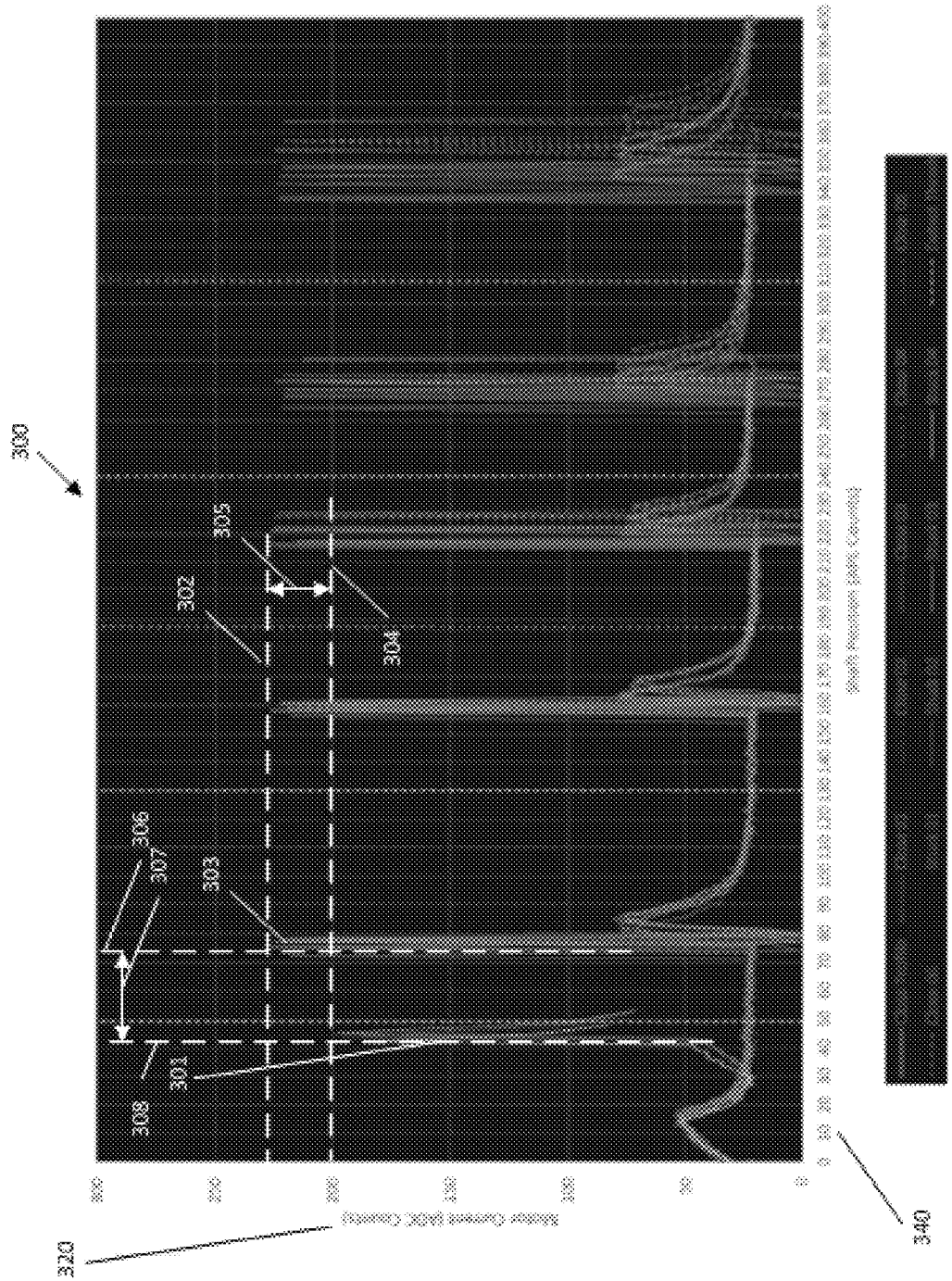
FIG. 3 is a graph in accordance with the first embodiment of the invention, comparing a first movable barrier behavioral profile from at least one prior successful movable barrier run, without door travel interruption, with the monitored movable barrier behavioral profile of a current movable barrier run over the same route, the respective movable barrier behavioral profiles derived, for example, from measured motor current and measured motor jack shaft position during the respective door runs, force being proportional to motor current.

Having completed an overall description of this first embodiment of the system and method of the invention of movable barrier monitoring and detection of true obstructions and other abnormal occurrences, reference is directed to FIG. 3 of a graph 300 comparing a first movable barrier behavioral profile from at least one prior successful garage door run (Profile 303), without door travel interruption, with the monitored movable barrier behavioral profile (Profile 301) of a current garage door run over the same route, the respective movable barrier behavioral profiles derived, for example, from measured motor current 320 and measured motor shaft position 340 during the respective door runs.

Motor current 304 corresponds to the current drawn by a motor 18 attempting to close a jammed garage door 28 ("fault state motor current" 304) and motor current 302 corresponds to the current drawn by a motor 18 attempting to close a properly functioning garage door 28 ("nominal motor current" 302). The motor current difference 305 between the nominal motor current 302 and the fault state motor current 304 is calculated by the controller 14 by measuring the difference between the nominal motor current 302 stored by the controller 14 and the detected motor current 304 measured during the current run.

Motor shaft position 340 also reveals whether a door 28 is properly functioning or jammed. For instance, a motor 18 turning to lower a movable barrier 28 will exhibit a spike in motor current 304 upon being driven with a momentary reversal pulse. The elapsed time between the momentary reversal pulse and the spike will be different for a motor 18 that is under a heavier load (e.g., at least partially supporting a movable barrier 28 than for a motor 18 that is under a lighter load (e.g., the movable barrier 28 is jammed and the motor 18 is unwinding a cable that would suspend the movable barrier 28 if it were not jammed). However, rather than measuring time, an encoder on a motor shaft may measure motor shaft position 340 as a proxy for time. Thus, a successful movable barrier run (Profile 303) shows a peak at a nominal motor shaft position 306 and a monitored movable barrier behavioral profile (Profile 301) of a run where the door 28 is jammed shows a peak at a fault motor shaft position 308. The fault-to-nominal motor shaft position difference 307 between the nominal motor shaft position 306 and the fault motor shaft position 308 is calculated by the controller 14 by measuring the difference between the nominal motor shaft position 306 stored by the controller 14 and the detected motor position (fault motor shaft position 308) measured during the current run. The difference between these two positions may be termed a "position factor." This "position factor" may be compared to an expected value (a "pre-set acceptable comparison criteria").

Figure 4:
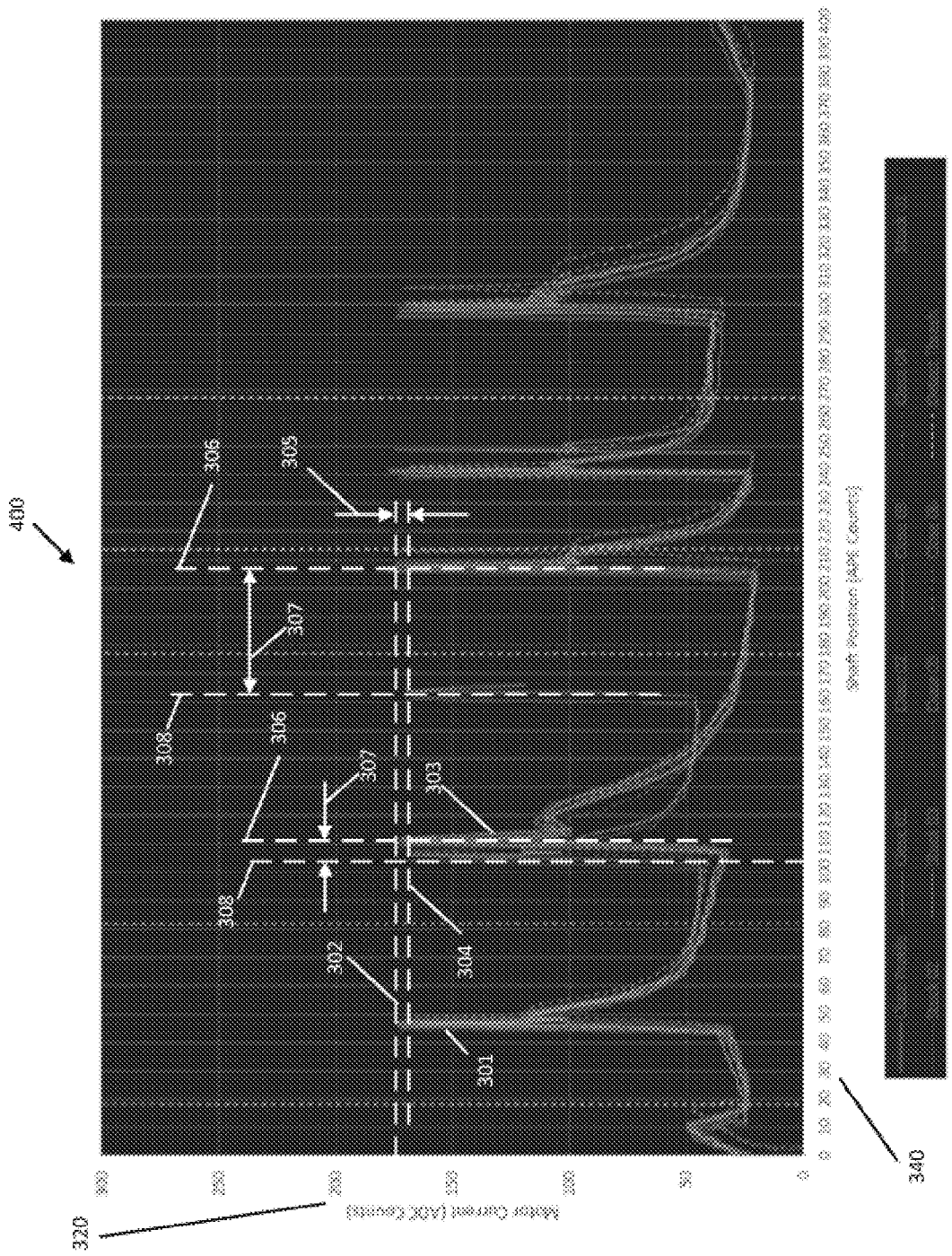
FIG. 4 is a graph in accordance with the first embodiment of the invention, comparing a second movable barrier behavioral profile from at least one prior successful movable barrier run, without door travel interruption, with the monitored movable barrier behavioral profile of a current movable barrier run over the same route, the respective movable barrier behavioral profiles derived, for example, from measured motor current and measured motor jack shaft position during the respective door runs, force being proportional to motor current.

With reference to FIG. 4, an important property is illustrated in comparison to FIG. 3. FIG. 4 shows aspects of a system and method for movable barrier monitoring of the movement of a relatively light weight movable barrier. A graph 400 demonstrates the usefulness of calculating an accumulated door position discrepancy for identifying error states that otherwise might be overlooked. Graph 400 also shows a first movable barrier behavioral profile from at least one prior successful movable barrier run (Profile 303), without door travel interruption, with the monitored movable barrier behavioral profile (Profile 301) of a current movable barrier run over the same route, the respective movable barrier behavioral profiles derived, for example, from measured motor current 320 and measured motor shaft position 340 during the respective door runs.

Motor current 304 corresponds to the current drawn by a motor 18 attempting to close a jammed movable barrier 28 ("fault state motor current" 304) and motor current 302 corresponds to the current drawn by a motor 18 attempting to close a properly functioning movable barrier 28 ("nominal motor current" 302). The motor current difference 305 between the nominal motor current 302 and the fault state motor current 304 is calculated by the controller 14 by measuring the difference between the nominal motor current 302 stored by the controller 14 and the detected motor current 304 measured during the current run. Notably however, the motor current difference 305 is relatively small and potentially within a range of variation and noise within a practical system. Thus, mere monitoring of motor current 304 may fail to reveal the fault condition.

Motor shaft position 340 also reveals whether the door 28 is properly moving or is jammed. For instance, a motor 18 turning to lower a movable barrier 28 will exhibit a spike in motor current 304 upon being driven with a momentary reversal pulse. The elapsed time between the momentary reversal pulse and the spike will be different for a motor 18 that is under a heavier load (e.g., at least partially supporting a movable barrier 28 than for a motor 18 that is under a lighter load (e.g., the movable barrier 28 is jammed and the motor 18 is unwinding a cable that would suspend the movable barrier 28 if it were not jammed). However, rather than measuring time, an encoder on a motor shaft may measure motor shaft position 340 as a proxy for time. Thus, a successful movable barrier run (Profile 303) shows a peak at a nominal motor shaft position 306 and a monitored movable barrier behavioral profile (Profile 301) of a run where the door 28 is jammed shows a peak at a fault motor shaft position 308. The fault-to-nominal motor shaft position difference 307 between the nominal motor shaft position 306 and the fault motor shaft position 308 is calculated by the controller 14 by measuring the difference between the nominal motor shaft position 306 stored by the controller 14 and the detected motor position (fault motor shaft position 308) measured during the current run. The difference between these two positions may be termed a position factor. This difference may be compared to an expected value (a "pre-set acceptable deviation criteria"). However, this position factor may fall within the pre-set acceptable deviation criteria because the inertial contribution of a particularly light (or horizontally traveling) door does not induce an appreciable fault-to-nominal motor shaft position difference 307.

To resolve these concerns, a controller 14 may calculate the fault-to-nominal motor shaft position difference 307 and store this value. Multiple momentary reversal pulses may be provided so that multiple spikes in motor current 304 are generated. As such, multiple fault-to-nominal motor shaft position differences 307 will be produced. Each may be measured and then added to the stored value. In this manner, an accumulated door position discrepancy may be calculated over time. The accumulated door position discrepancy will reflect the jammed nature of a jammed door 28 as the motor shaft position increasingly lags expectations because the door 28 is not providing an expected inertial contribution to the moving mass of the system (motor 18, jack shaft 22, movable barrier 28). Because the motor shaft position increasingly lags expectations, this lagging trend will emerge from the noise and variations in data collected in a practical installation.

In various circumstances, the series of momentary reversal pulses may be provided over only a portion of the run of the garage door 28. The controller 14 may be configured to begin the comparison of the movable barrier behavioral profiles during an initial portion of a movement of the door 28, rather than for an entire duration of its travel. Moreover, the initial stored "good" movable barrier behavioral profile may be generated during either a "learn" mode or "operate" mode of the controller 14.

Figure 5:
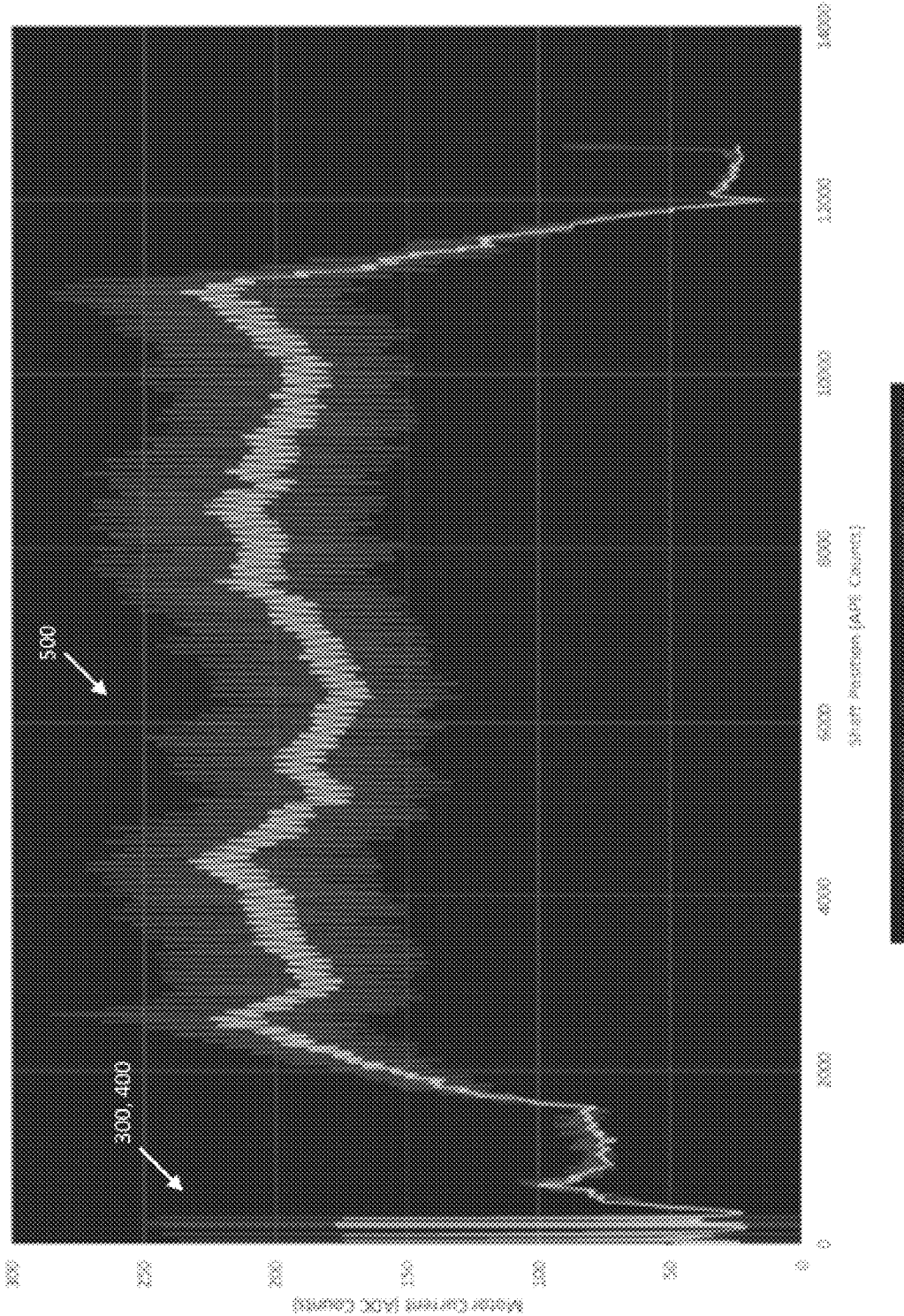
FIG. 5 is a graph in accordance with the first embodiment of the invention, showing movable barrier behavioral profiles, without door travel interruption, over the entire route of the movable barrier run from one end to the other end, and displaying the measured motor current and measured motor shaft position during the respective door runs, force being proportional to motor current.

For example, FIG. 5 shows a graph 500 of motor current 320 and motor shaft position 340 for an entire end-to-end run of a movable barrier. Notably, graphs 300 and 400 (FIGS. 3 and 4) which show a series of momentary reversal pulses, are confined to the initial portion of the run of the movable barrier 28. In various instances, this portion of the run corresponds to a portion of travel wherein part or all of the movable barrier 28 is horizontal so that the contribution of gravity to overcoming potential jams is diminished. However, in other instances, the momentary braking pulses may be provided for the entirety of the run of the movable barrier 28.

Figure 6:
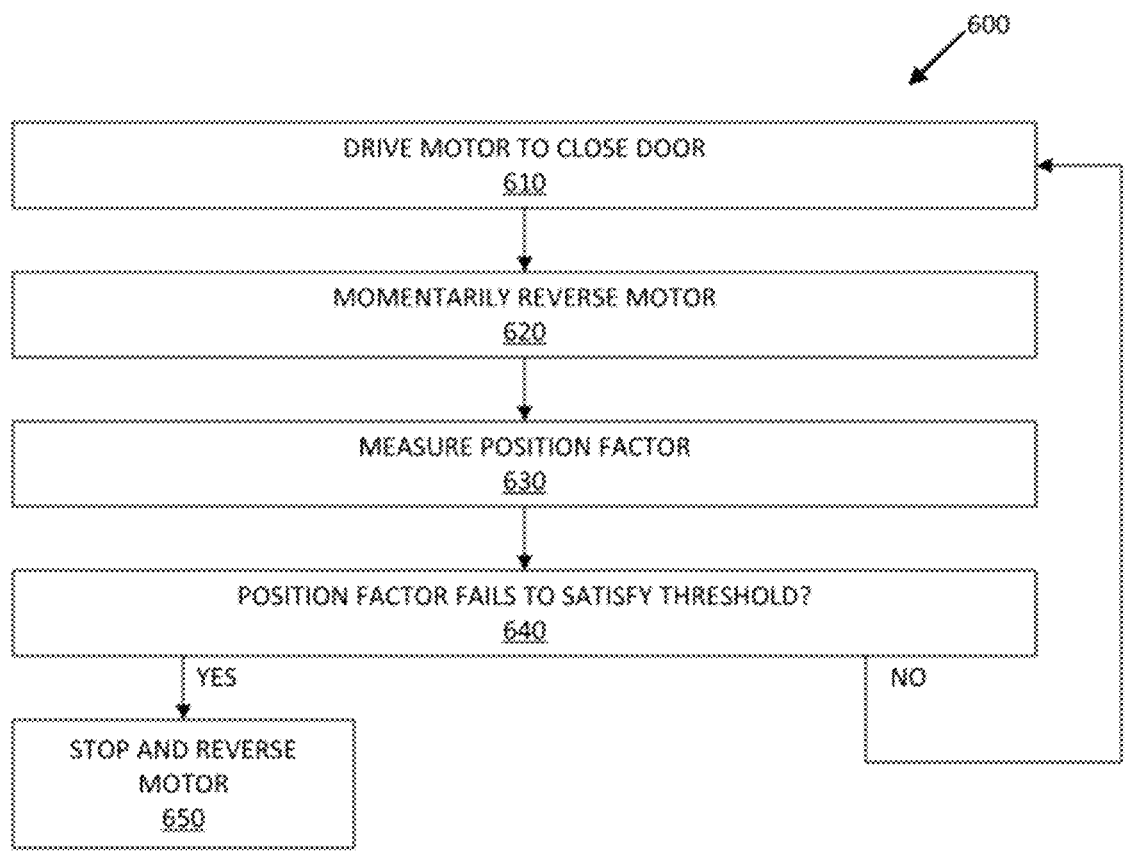
FIG. 6 depicts a flow diagram of the method of monitoring movable barrier closure, including the measurement of motor current as a position factor, in accordance with the first embodiment of the invention.

With reference now to FIG. 6, a flowchart depicts an example method 600 of operating a movable barrier opener system in accordance with this embodiment of the invention. Accordingly, the method may include driving, by the controller 14, the motor 18 to close the garage door 28 (block 610). The controller 14 may momentarily reverse the motor 18 (block 620). The controller 14 may then measure the position factor, for example, peak motor current associated with the reversal (block 630). The position factor (here, peak motor current) is compared to a threshold (block 640). If the position factor (here, peak motor current) fails to satisfy the threshold (e.g., is less than expected), then the controller 14 may stop and reverse the motor 18 because this condition is associated with the door 28 having jammed or become obstructed during travel in a closing (e.g., downward) direction. (block 650). If the current satisfies the threshold, then the motor 18 continues to be driven (block 610).

Figure 7:
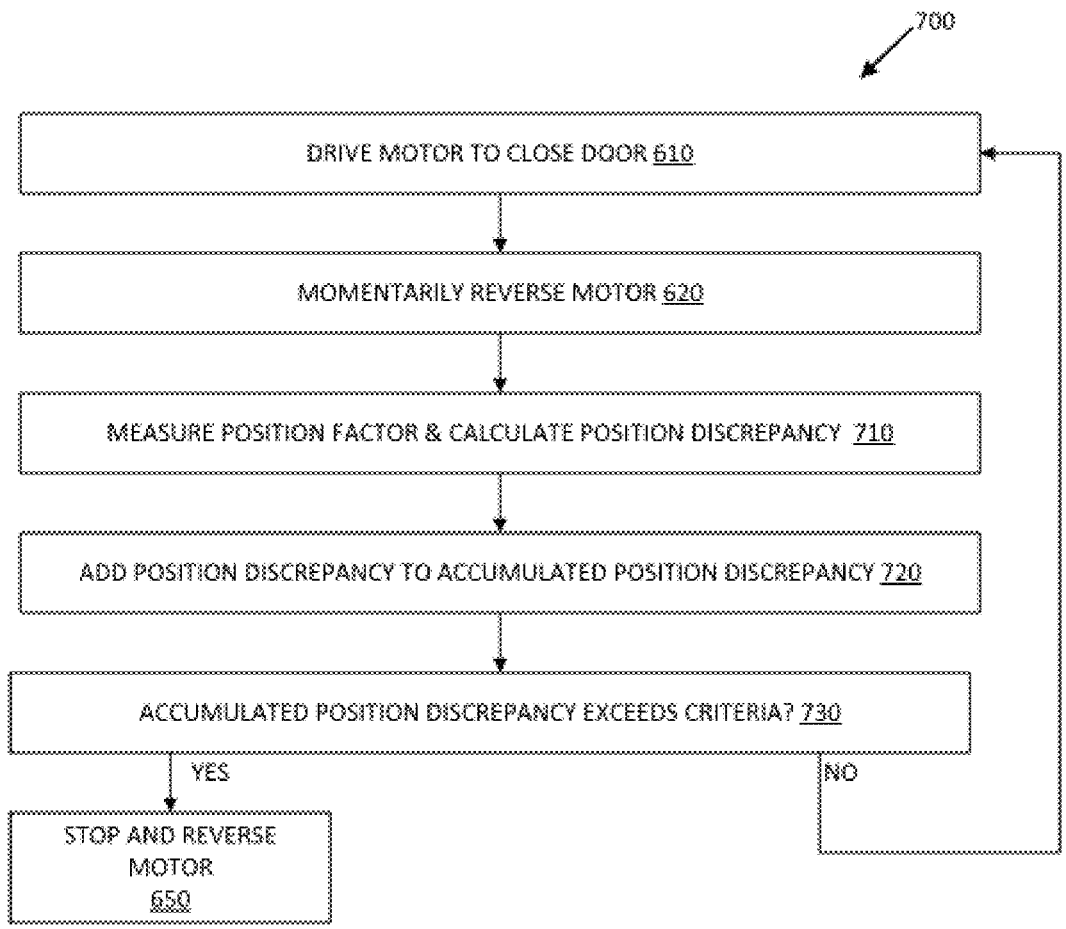
FIG. 7 depicts a flow diagram of the method of monitoring movable barrier closure, including the measurement of accumulated door position discrepancy, in accordance with the first embodiment of the invention.

With reference to FIG. 7, a flowchart is provided depicting a further example 700 of operating a movable barrier opener system in accordance with this embodiment of the invention. The method may include driving, by controller 14, the motor 18 to close the garage door 28 (block 610). The controller 14 momentarily reverses the motor 18 (block 620). The controller 14 then measures a position factor, for example motor shaft position at the point of peak motor current associated with the momentary motor reversal and may calculate a door position discrepancy corresponding to the difference of this position factor and the same position factor for a known good run (block 710). This door position discrepancy may be added to an accumulated door position discrepancy (block 720). The accumulated door position discrepancy may be compared to a pre-set acceptable deviation criteria (block 730). In response to the accumulated door position discrepancy not being within the pre-set acceptable deviation criteria, then the controller 14 may stop and reverse the motor 18 because this condition is associated with the movable barrier 28 having jammed or become obstructed during travel in a closing (e.g., downward) direction (block 650). If the accumulated door position is within the pre-set acceptable deviation criteria, then the controller 14 continues to drive the motor 18 to close the door 28 (block 610).

As an alternative to comparing a currently monitored movable barrier behavioral profile with a stored movable barrier behavioral profile from a prior successful run, a currently monitored movable barrier behavioral profile may preferably be compared with a model of a movable barrier behavioral profile. The model is initially generated by performing a linear least squares fit to a known "good" monitored movable barrier behavioral profile (i.e., during a barrier run where obstructions or abnormal occurrences were not encountered). If each currently monitored movable barrier behavioral profile satisfies the acceptable deviation criteria, then the currently monitored movable barrier behavioral profile is incorporated into the model. One mechanism of incorporating evolving data into the model is by expanding a linear least squares fit that generates the model to include the data from the currently monitored movable barrier behavioral profile. Therefore, the model is continually updated over time.

B. Second Embodiment of Invention (Correlation Approach)

In accordance with the second embodiment of the invention, the controller 14 is configured and programmed to (i) monitor a chosen force factor that is indicative of the force applied by the motor 18, (ii) then replicate therefrom the "force factor profile pattern", as previously defined, during the door's travel along a defined travel path, (iii) then compare the force factor profile pattern of the currently monitored door run with the force factor profile pattern of a "good" run along the identical defined travel path, without any barrier travel interruptions, to determine the difference between them, or the "force profile discrepancy", (iv) determine the "correlation coefficient" based upon this force profile discrepancy, and (v) determine whether the correlation coefficient is, or is not, within the pre-set acceptable comparison criteria, the latter indicative of an obstruction or abnormality, resulting in the controller 14 stopping (or stopping and reversing) the motor 28, the former resulting in the controller 14 continuing to drive motor to close the door.

Any suitable force factor indicative of force applied by a motor may be chosen to be monitored by the controller 14. For example, in the following description, motor current drawn by the motor 18 is chosen due to force applied by a motor being directly proportional thereto. One may also have chosen, for example, motor speed, force applied by a motor being inversely proportional to motor speed.

Figure 14:
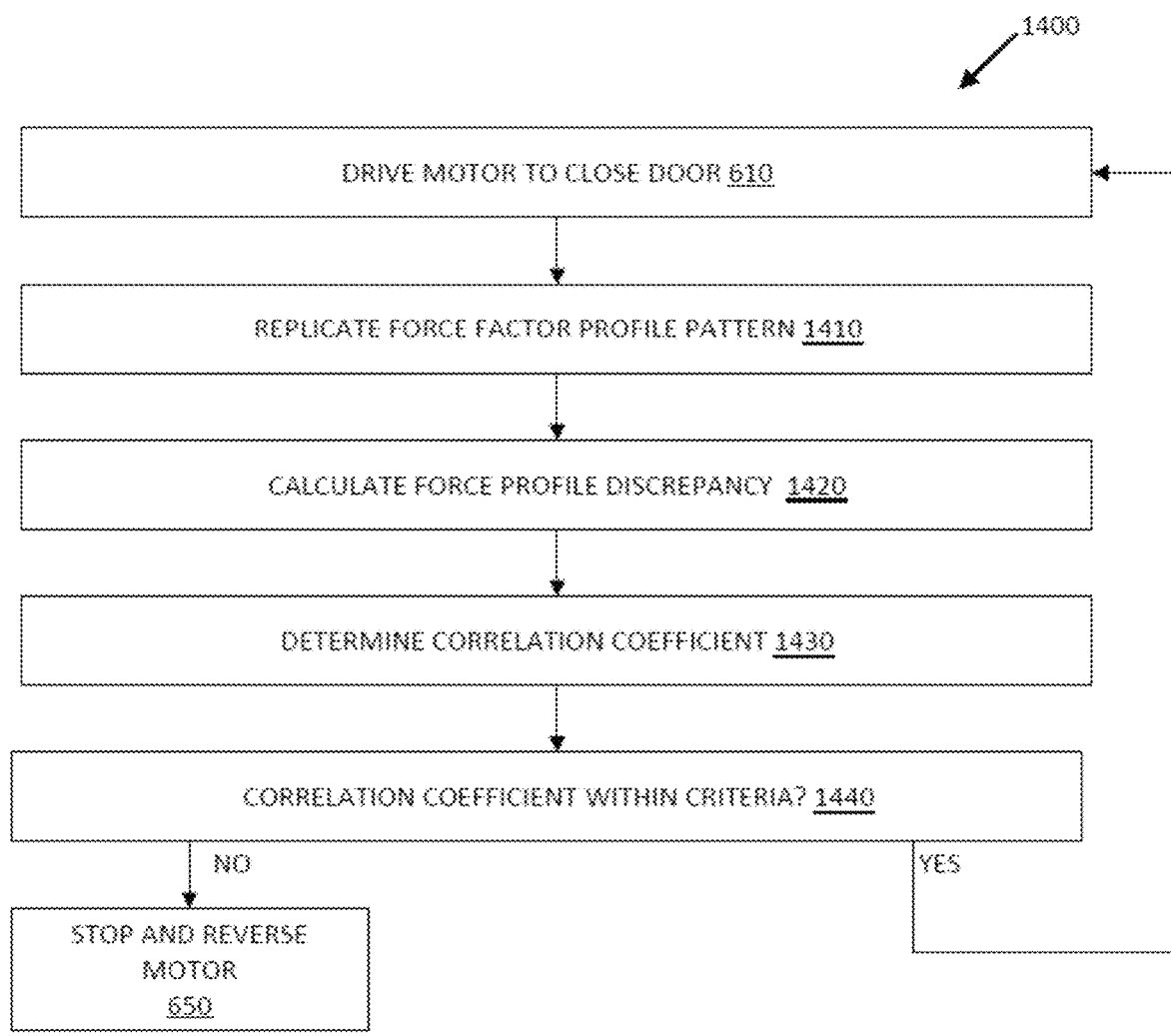
FIG. 14 depicts a flow diagram of the method of monitoring movable barrier closure, including determination of force correlation coefficient compared to acceptable comparison criteria, in accordance with the second embodiment of the invention.

The monitoring method of this invention can apply to the entirety, or any portion, of the defined travel path of the garage door 28 between its open and closed limits. However, as an example, and because accurate and reliable detection of obstructions and abnormal occurrences are particularly challenging under the circumstances of a motor driven jack shaft type drive assembly moving a garage door from its open to closed position. Accordingly, with reference to the flow diagram of FIG. 14, the monitoring method 1400 is depicted with motor 18 initially being driven by controller 14 to close garage door 28 [block 610]. Controller 14, monitoring the current drawn by motor 18, replicates the force factor profile pattern of the currently monitored "run" of the door 28 [block 1410]. The controller 14 next mathematically compares its so-replicated force factor profile pattern with a stored force factor profile pattern, the latter resulting either from an initial factory setting, or from a prior "good" run, but without any door travel interruptions along the entire defined travel path. This comparison produces a calculated force profile discrepancy [block 1429], from which the controller determines the correlation coefficient [block 1430].

The controller 14 then compares this computed correlation coefficient with pre-set acceptable comparison criteria (i.e., sufficiently high pre-set correlation coefficient) to determine whether the correlation coefficient is within the pre-set acceptable comparison criteria (i.e., whether the correlation coefficient is at least as high as the pre-set correlation coefficient) (block 1440). If the computed correlation coefficient is within the acceptable comparison criteria (i.e., at the desired correlation coefficient level), then the controller 14 is programmed to instruct the motor to continue to move the door along its defined travel path without any interruption of door travel (block 610). On the other hand, if the correlation coefficient, at any portion of the defined travel path, is (or becomes) not within the pre-set acceptable comparison criteria (i.e., below the desired correlation coefficient level, the controller 14, therefore assessing that the garage door 28 has encountered a true travel obstruction or an abnormal occurrence such as a loss of tension in the cable 27, immediately responds by stopping, or stopping and reversing, the motor, and therefore the garage door 28 (block 650).

In some situations, there may be variable pre-set acceptable comparison criteria programmed into the controller 14 for respectively different portions of the defined travel path, to allow for different forces to be applied to the garage door, or even for no restrictions on the force to be applied, such as at the beginning or the end of the travel path.

In other situations, the controller 14 is configured to mathematically compare only discrete samples of the replicated force profile patterns for different portions of the travel path, rather than for the entire travel path.

Utilizing this so-described second embodiment of the force monitoring method of the present invention, as opposed to an approach that is based solely upon the presence or absence of force spikes in the monitored force factor profile pattern, not only reduces the number of needless door travel interruptions, but enables responses to abnormal occurrences that may not otherwise be responded to. For example, in the described jack shaft type motor drive assembly, in the event of the unspooling of the cable(s) from the drum, and the consequent loss of cable tension, the force monitoring method of the present invention will detect such event as an abnormal occurrence, resulting in immediate motor stoppage and reversal, restoring the tension as the door returns to its open position.

In accordance with a feature of the force monitoring method of the invention, the correlation coefficient can be defined, for example, as a number in the range of 0 to 1, with 0 indicating a 0% degree of correlation (i.e., a complete lack of correlation) between the currently monitored force profile pattern and the "good" stored force profile pattern, and with 1 indicating a 100% degree of correlation (i.e., a perfect match) between the currently monitored force profile pattern and the "good" stored force profile pattern. If the pre-set acceptable comparison criteria is then programmed into the controller 14 to be less than a perfect match of the patterns, for example a 0.8 correlation coefficient (i.e., an 80% degree of correlation), then the controller 14 causes the motor 18 to stop, or to stop and reverse, when the degree of correlation between the compared profile patterns is less than 80%, but not if it is at 80%, or higher. Of course, the acceptable comparison criteria can be pre-set, higher or lower than 80%, depending upon the desired sensitivity, and can also be set at variable percentages depending upon the location(s) in the defined travel path.

In accordance with alternate embodiments, the controller 14 is configured to begin the comparison of the force profile patterns after a delay period of time after, rather than at, start-up. Moreover, the initial stored "good" force profile pattern may be generated during either a "learn" mode or "operate" mode of the controller 14.

The correlation coefficient can be determined in a variety of different ways. As one preferred approach, the correlation coefficient $r^2$ is calculated using sums of squared deviations from mean values. Specifically, using X as the set of values of the known good force profile, X' as the measured set of values of the currently monitored force profile, $\overline{X}$ and $\overline{X'}$ as their respective means, and n as the number of samples, the correlation coefficient $r^2$ can be mathematically determined as follows:

$$r^2 = \frac{\Sigma XX' - n\overline{XX'}}{\left(\Sigma X^2 - n(\overline{X})^2\right)\left(\Sigma X'^2 - n(\overline{X'})^2\right)}$$

While the component sums used to calculate $r^2$ may be used to separately calculate a fitted curve Y=AX'+B, calculation of this curve and the sets of values for A and B is not necessary for this approach.

Using this mathematical formulation affords several advantages. For one, the force monitoring function of this embodiment of the invention is independent of linear relationships between X and X'. In addition, this technique allows the introduction of "scaling" or "offset" of values which could be caused by environmental variations, such as temperature differences. When these parameters change, although the currently generated force profile itself changes, the corresponding $r^2$ value stays the same.

Figure 8A:
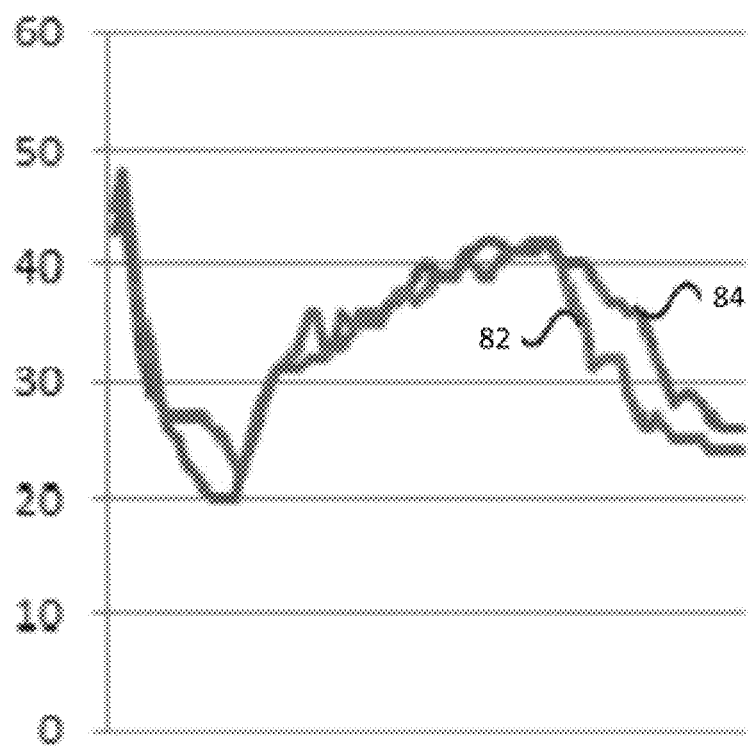
FIG. 8A is a graph in accordance with the second embodiment of the invention, comparing a stored monitored force factor profile pattern from a prior successful garage door run, without door travel interruption, with the monitored force factor profile pattern of a current garage door run over the same route, the respective force factor profile patterns derived, for example, from raw measured motor current during the respective door runs, force being proportional to motor current.
Figure 8B:
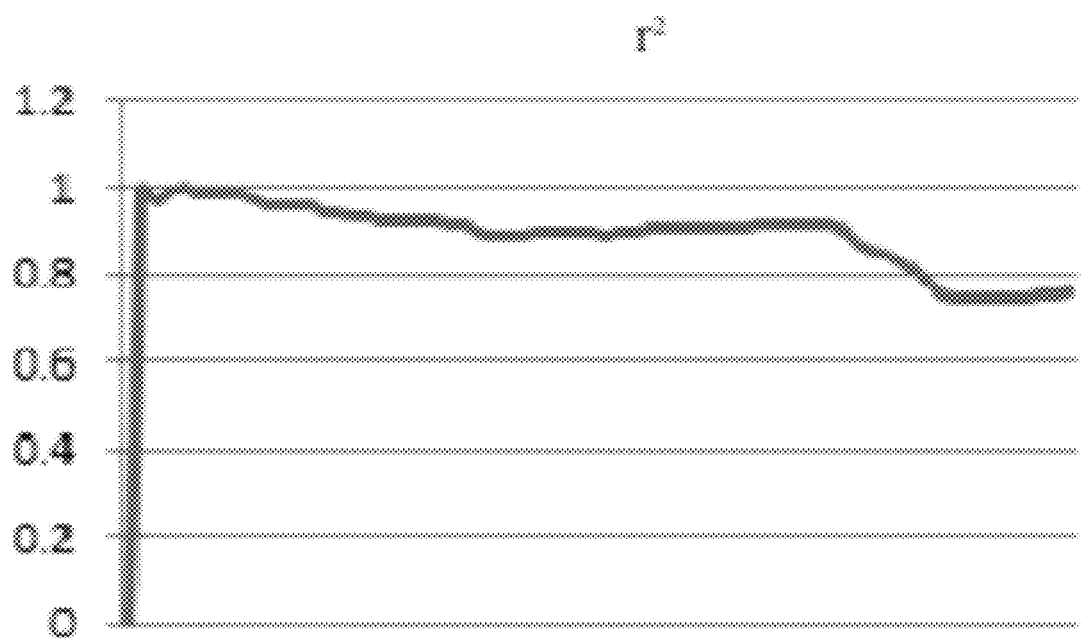
FIG. 8B shows the correlation coefficient (degree of correlation) between the two force factor profile patterns of FIG. 8A.
Figure 9A:
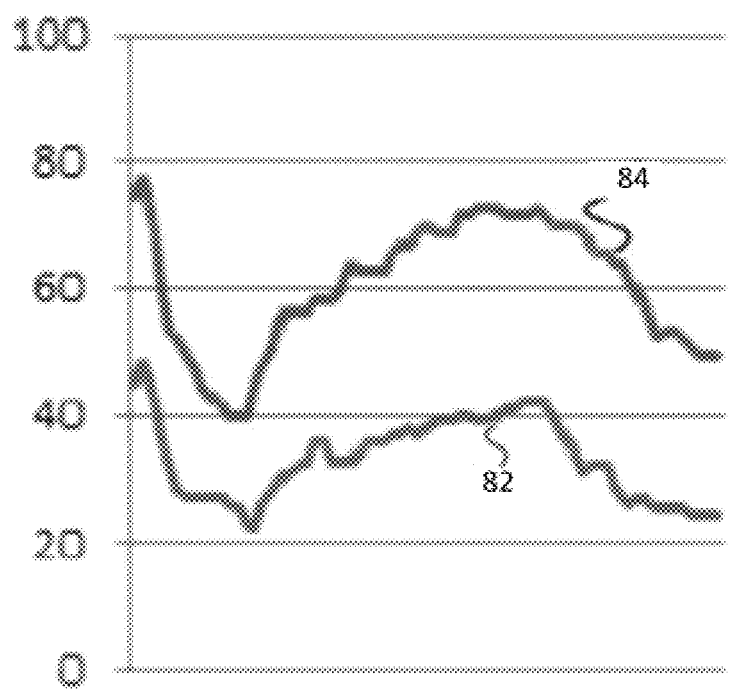
FIG. 9A shows a scaled and offset version of the comparison of the force factor profile patterns of FIG. 8A for the same garage door runs.
Figure 9B:
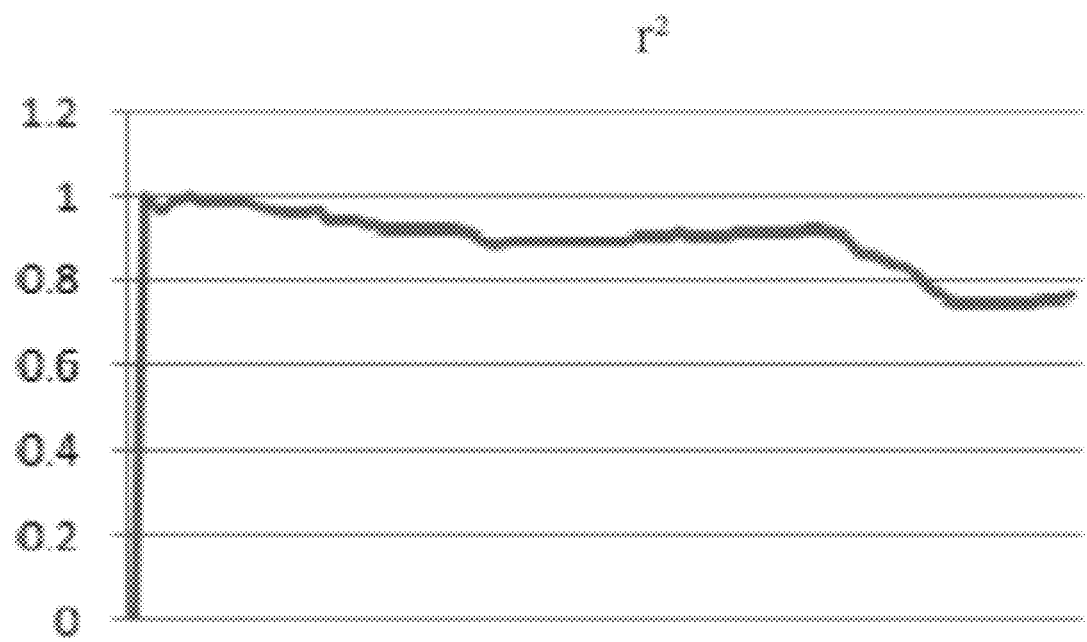
FIG. 9B shows the correlation coefficient (degree of correlation) between the two force factor profile patterns of FIG. 9A.

To help illustrate these advantages, shown in FIG. 8A is a graph of the comparison of the stored force profile pattern (Profile 82) of a prior successful garage door run with the force factor profile pattern (Profile 84) of the currently monitored garage door run, and shown in FIG. 8B is the resulting correlation coefficient. It is to be noted that although the two patterns differ at points, the correlation coefficient remains relatively constant around 0.9 until the differences between the compared force factor profile patterns become greater, at which point the correlation coefficient falls below 0.8. Shown in FIGS. 9A and 9B are graphs of the force factor profile patterns for the same runs, but scaled and offset, illustrating the essentially identical resulting correlation coefficient, and therefore the inherent insensitivity to Gaussian noise.

Figure 10A:
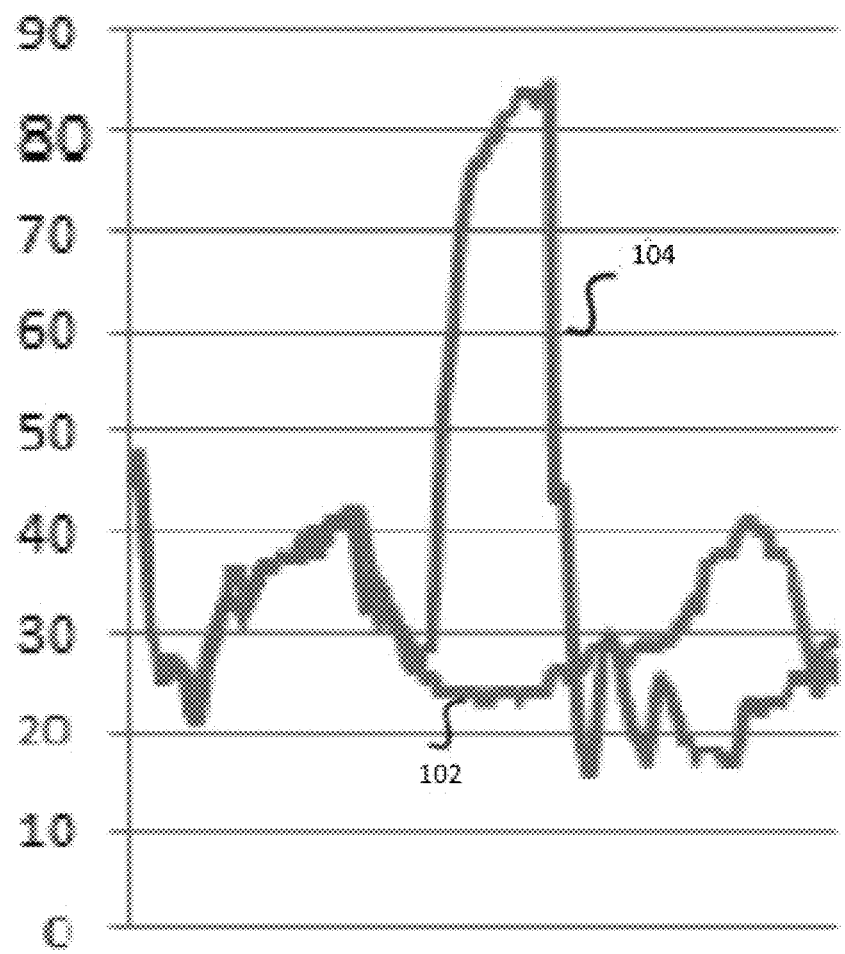
FIG. 10A is a graph in accordance with the second embodiment of the invention, comparing the stored force profile factor pattern (Profile 102) of a prior successful garage door run, without door interruption, with the monitored force factor profile pattern (Profile 104) of an unsuccessful (anomalous) garage door run, the respective force factor profile patterns derived, for example, from raw measured motor current during the respective door runs.
Figure 10B:
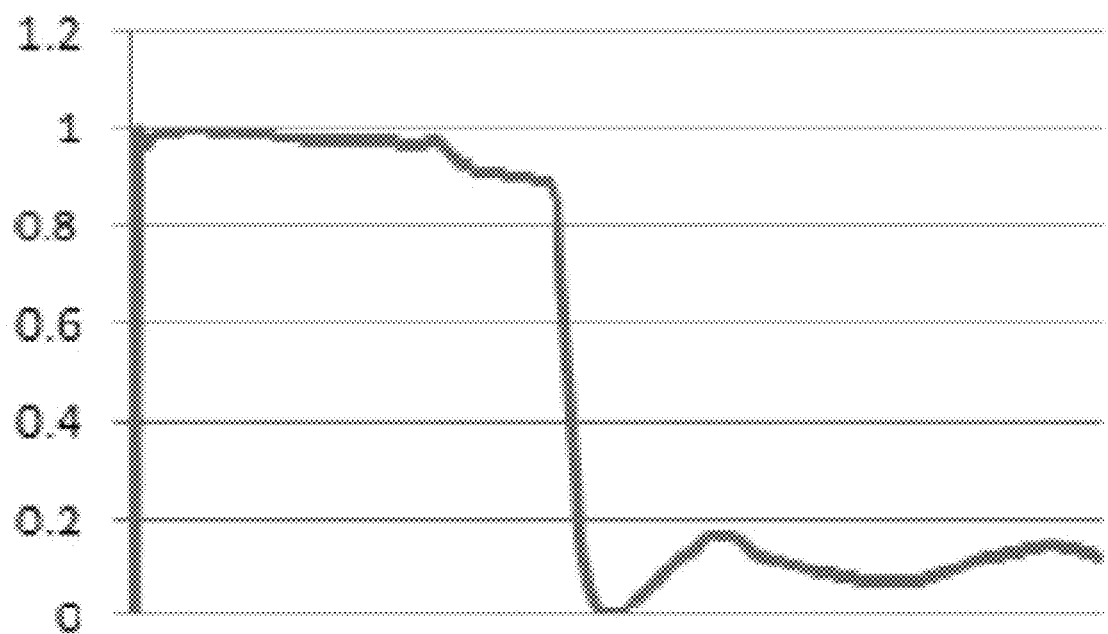
FIG. 10B shows the calculation of the correlation coefficient (degree of correlation) between the two force factor profile patterns of FIG. 10A
Figure 11A:
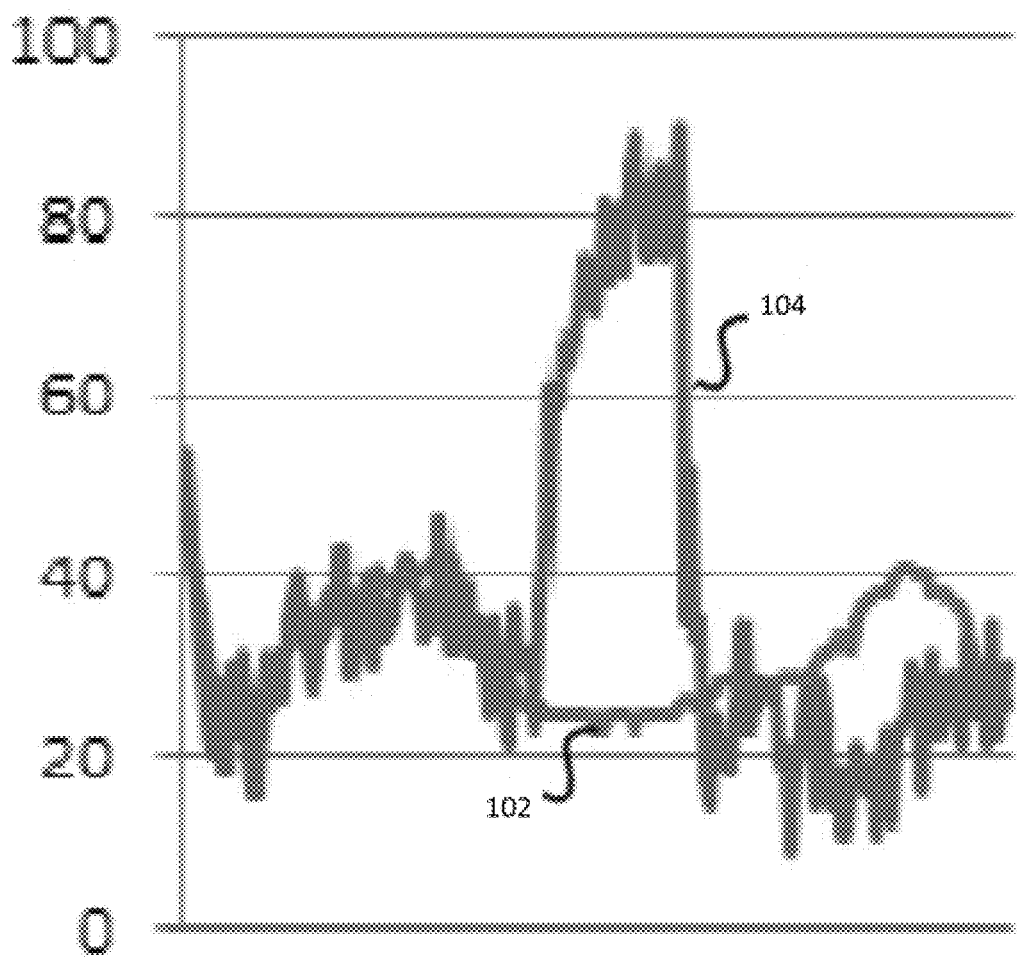
FIG. 11A is a graph comparing the force factor profile pattern (Profile 102) of a prior successful garage door run like that shown in FIG. 10A, with the currently monitored force factor profile pattern (Profile 104) of the unsuccessful garage door run of FIG. 10A, with noise added.
Figure 11B:
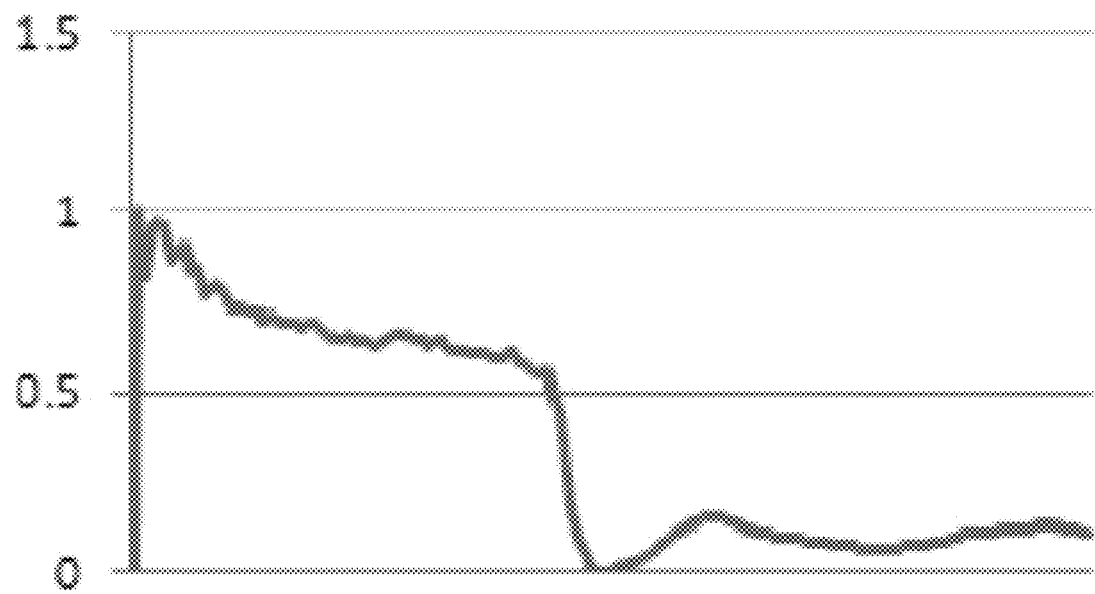
FIG. 11B shows the calculation of the correlation coefficient (degree of correlation) between the force factor profile patterns of FIG. 11.

The graphs of FIGS. 10A and 10B illustrate the comparison of the two force factor profile patterns, stored force factor profile pattern (Profile 102) and currently monitored force factor profile (Profile 104), utilizing the motor current as the force factor. FIGS. 10A and 10B, respectively show the raw measured motor current comparison of the two force factor profile patterns, and the consequent correlation coefficient $r^2$ resulting from the garage door's impact with a true obstruction during the currently monitored run. The graphs in FIGS. 11A and 11B show equivalent plots for the same data with random noise at levels +/−25% of the median.

Figure 12A:
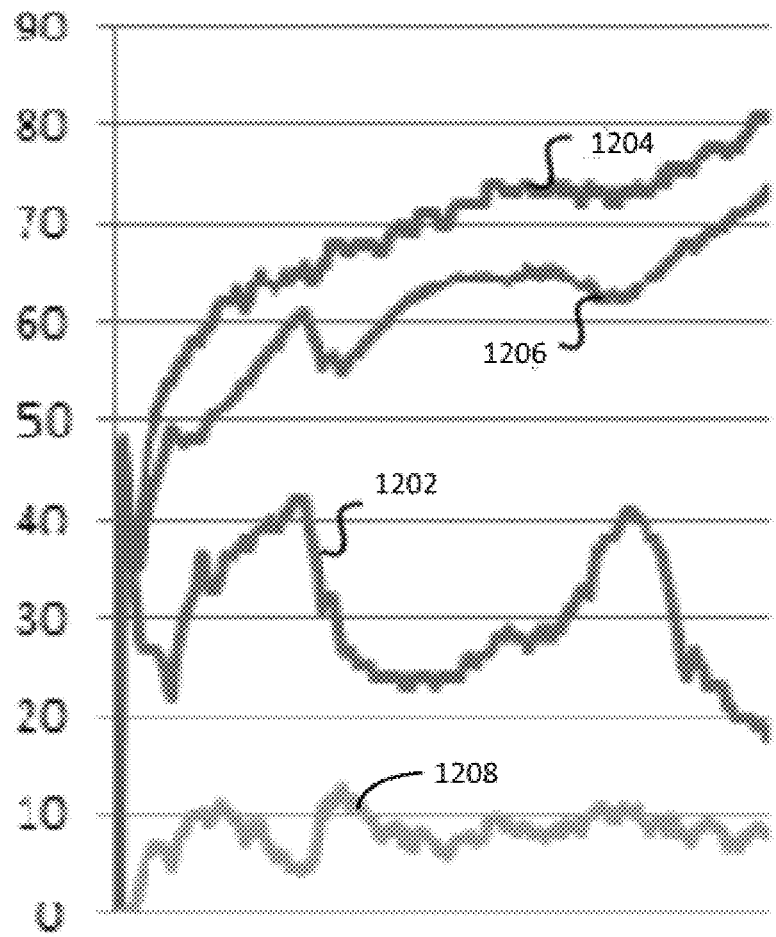
FIG. 12A is a graph in accordance with the second embodiment of the invention, comparing the force factor profile pattern (Profile 1204) of an unsuccessful (anomalous) garage door run, in which the door is stuck in the fully open position, with the stored force factor profile pattern (Profile 1202) of a previously successful garage door run, and also compared with the force factor profile pattern (Prediction 1206) of a modeled or predicted force profile.
Figure 12B:
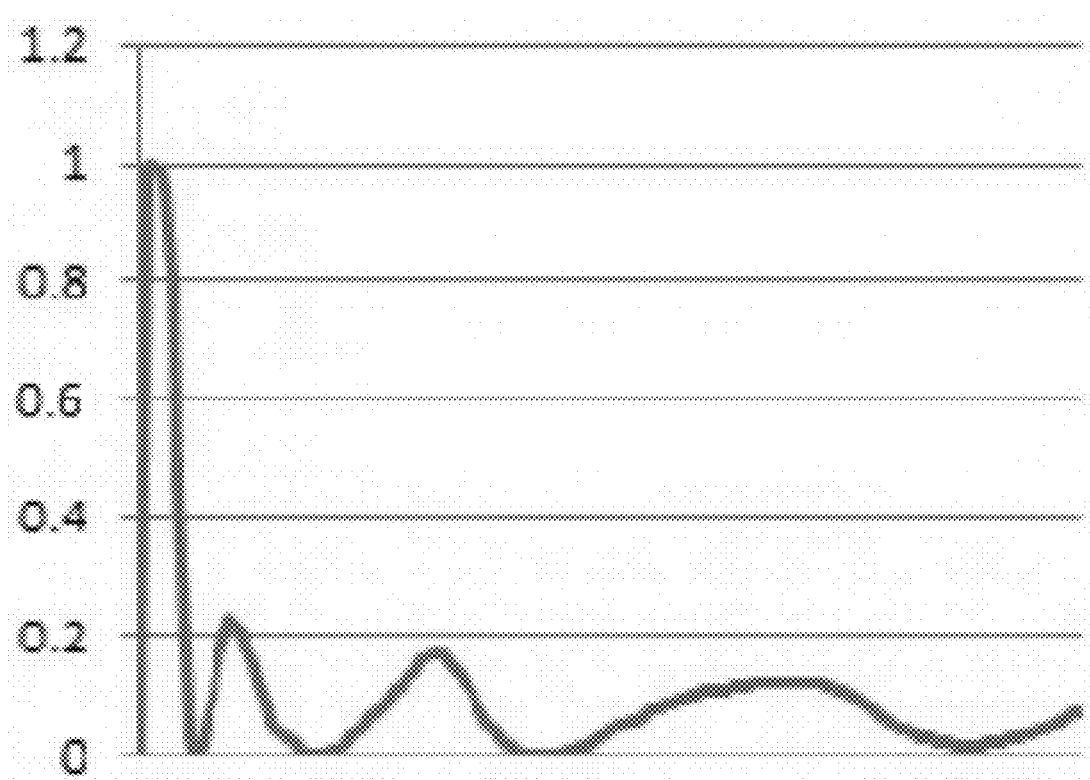
FIG. 12B shows the correlation coefficient (degree of correlation) between the force factor profile pattern of the unsuccessful run and either of the force factor profile patterns of the successful run or the predicted force profile of FIG. 12A.
Figure 13A:
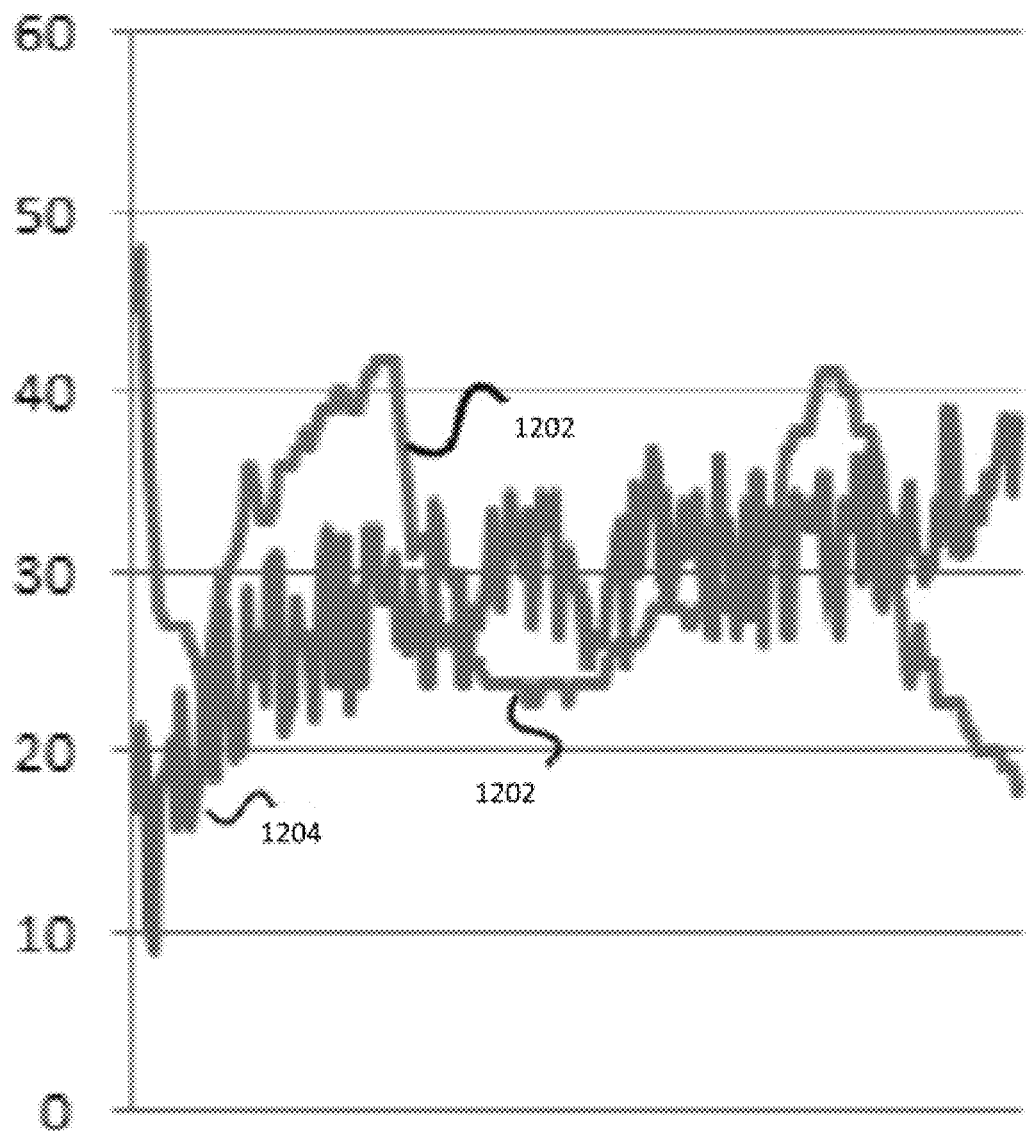
FIG. 13A is a graph in accordance with the second embodiment of the invention, comparing a scaled and offset version of the force factor profile pattern (Profile 1204) of the unsuccessful currently monitored garage door run of FIG. 12A with the stored force profile pattern (Profile 1202) of a previously successful garage door run.
Figure 13B:
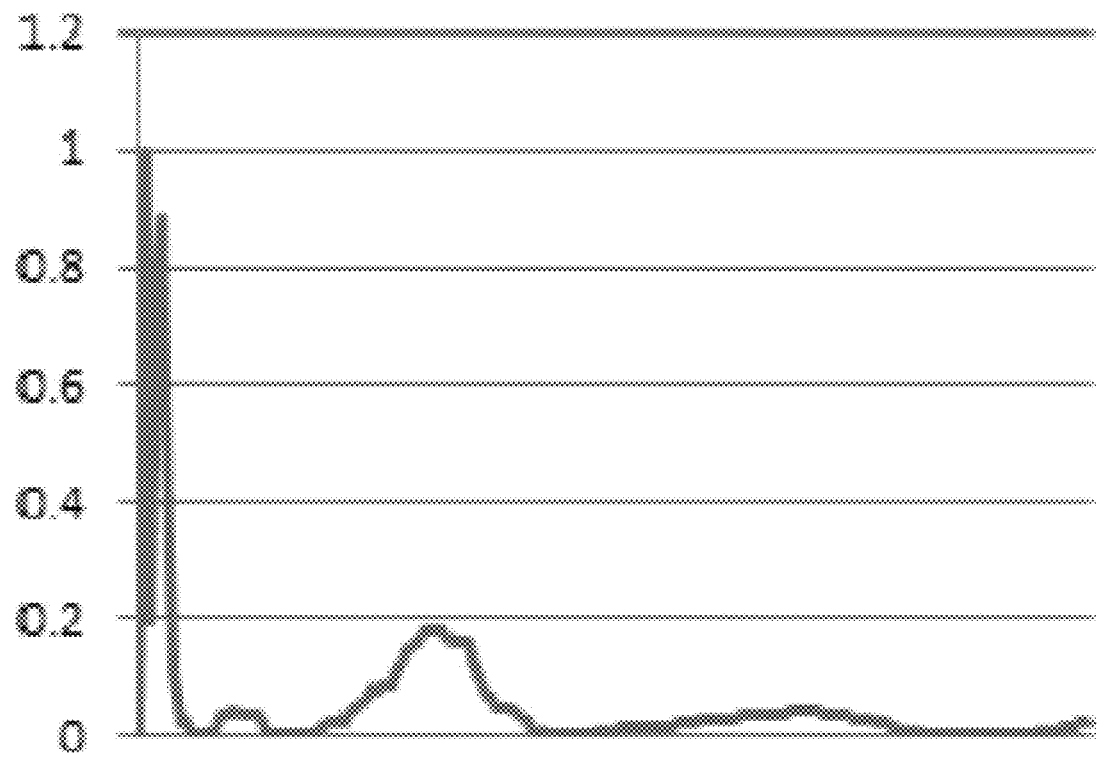
FIG. 13B shows the correlation coefficient (degree of correlation) between the force factor profile patterns of FIG. 13A.

In FIGS. 12A and 12B, least-squares prediction (Prediction 1206) stays within a constant margin (prediction error 1208) of the measured values of the current run (Profile 1204). The correlation coefficient $r^2$ drops to levels indicating anomalous barrier travel conditions. Here, as well, the correlation coefficient approach shows good results under scaling, offset, and noise, as reflected in FIGS. 13A and 13B. These Figures show the same profile patterns of FIGS. 12A and 12B, but also including noise. Notwithstanding, the resulting correlation coefficient reflects the presence of the anomalous barrier travel conditions.

Alternative techniques may be programmed into the garage door operator controller to determine the correlation coefficients. For example, one may use either a Pearson correlation, Kendall rank correlation, Spearman correlation, or a Point-Biserial correlation, or any combination thereof, as a substitute for the preferred mathematical formulation previously described.

As an alternative to comparing a currently monitored force factor profile pattern with a stored force factor profile pattern from a prior successful run, a currently monitored force factor profile pattern may preferably be compared with a model of a force factor profile pattern. The model is initially generated by performing a linear least squares fit to a known "good" monitored force factor profile pattern (i.e., during a barrier run where obstructions or abnormal occurrences were not encountered). As each currently monitored force factor profile pattern is compared to the model to determine the correlation coefficients, and assuming a programmed pre-set acceptable comparison criteria of 0.8 (or 80% degree of correlation), if the determined correlation coefficient is at least equal to, or greater than, 0.8, then the currently monitored force factor profile pattern is incorporated into the model by expanding the linear least squares fit that generates the model to include the data from the currently monitored force factor profile pattern. Therefore, the model is continually updated over time.

The above described embodiment of the force monitoring method of the invention has been described using motor current as the force factor, motor current being a typical measure of motor force where the motor 18 is a DC motor. In installations where the motor 18 is an AC motor, the very same correlation techniques described above may be applied to measure the degree of correlation, although using, as one alternative preferred force factor, rotational speed of the motor shaft, motor force being inversely proportional to rotational speed of the motor shaft. A rotary encoder, of a type well known to those of ordinary skill in the art, may be used to directly measure the rotational speed of the output shaft of motor 18 in terms of revolutions per minute. This rotational speed of the motor is sampled over time to produce a speed profile pattern. Comparison of the speed profile pattern associated with a prior successful garage door run is then made with respect to the speed profile pattern associated with the currently monitored run in the same manner as previously described in order to determine the correlation coefficient.

While the monitoring embodiments of the present invention have been described in the context of a limited number of situations, those skilled in the art, having the benefit of this disclosure, will appreciate that other variations of these embodiments will be readily apparent that will also embody the principles of the monitoring embodiments of the present invention. Accordingly, the scope of the invention shall be limited only by the appended claims.

The invention claimed is:

1. A movable barrier opener system, comprising:
   a motor for moving a barrier along a defined travel path;
   a movable barrier operator controller configured to:
      initially define and store a first movable barrier behavioral profile indicative of a successful barrier run along the defined travel path, without barrier travel interruption, wherein the first movable barrier behavioral profile includes at least one position factor;
      subsequently define a second movable barrier behavioral profile indicative of a currently monitored barrier run along the defined travel path, wherein the second movable barrier behavioral profile includes the at least one position factor;
      drive the motor to move the barrier and provide periodical reversal pulses to periodically brake the motor during the currently monitored barrier run;
      compare the first and second movable barrier behavioral profiles to determine a door position discrepancy between the position factor of the first movable barrier behavioral profile and the position factor of the second movable barrier behavioral profile, and
      interrupt the operation of the motor, and therefore barrier travel, only when the door position discrepancy is indicative of an anomalous barrier travel condition.

2. The movable barrier opener system of claim 1, wherein the first movable barrier behavioral profile is either set at the factory or as a consequence of a successful barrier run prior to the currently monitored barrier monitor run.

3. The movable barrier opener system of claim 1, wherein the position factor comprises at least one of motor current and motor shaft position coinciding with a peak motor current.

4. The movable barrier opener system of claim 1, wherein the movable barrier operator controller is configured to determine the door position discrepancy between the first and second movable barrier behavioral profiles for a partial portion of a range of travel of the movable barrier corresponding to a plurality of periodic reversal pulses.

5. A movable barrier opener system, comprising:
   a motor for moving a movable barrier along a defined travel path;
   a jack shaft motor drive assembly for rotating a jack shaft and one or more cable drums rigidly attached to the jack shaft, with one or more cables disposed about the drums with the free end of each cable attached near the bottom of the movable barrier, the rotation of the jack shaft in a defined direction configured to lower the movable barrier;
   a movable barrier operator controller configured to:
      compare a first movable barrier behavioral profile, corresponding to motor current and motor shaft position, and indicative of a successful door run, without door travel interruption, along the defined travel path, with a second movable barrier behavioral profile, also corresponding to motor current and motor shaft position, indicative of a currently monitored movable barrier run along the defined travel path, wherein the currently monitored movable barrier run includes periodically braking the motor using momentary reversal pulses; and
      stop the motor when the comparison of the second movable barrier behavioral profile with the first movable barrier behavioral profile indicates a loss of tension in the one or more cables.

6. A movable barrier opener system, comprising:
   a motor for moving a barrier along a defined travel path;
   a movable barrier operator controller for controlling the operation of the motor, the controller configured to:
      define and store a first movable barrier behavioral profile indicative of a successful barrier run, without motor interruption, along at least a portion of the defined travel path;
      generate a second movable barrier behavioral profile indicative of a subsequent monitored barrier run along the same portion of the defined travel path, wherein the controller is configured to provide momentary reversal pulses to periodically brake the motor during the subsequent monitored barrier run;
      compare the second movable barrier behavioral profile with the first movable barrier behavioral profile to determine whether an accumulated door position discrepancy satisfies a pre-set acceptable deviation criteria; and
      compare the accumulated door position discrepancy to the pre-set acceptable deviation criteria programmed into the controller, the controller also configured to stop the motor when the accumulated door position discrepancy is not within the pre-set acceptable deviation criteria.

7. The movable barrier opener system of claim 6, wherein the pre-set acceptable deviation criteria is at least one of programmed into the controller, set by a user at the time of installation of the movable barrier operator, and set proportional to a mass of the movable barrier.

8. A method of operating a movable barrier opener system, the method comprising the steps of:
   a) directing a motor to move a barrier substantially along a defined travel path;
   b) sensing current drawn by the motor during the movement of the barrier substantially along the defined travel path;
   c) providing momentary reversal pulses to periodically brake the motor during the movement of the barrier substantially along the defined travel path and determining the motor shaft position associated with corresponding peaks in the current;
   d) calculating a door position discrepancy measurement comprising a difference between at least one motor shaft position associated with at least one of the corresponding peaks in the current and at least one motor shaft position associated with at least one peak in the sensed current of at least one past good run of the barrier; and
   e) directing the motor to cease movement, or cease and reverse movement, of the barrier upon the door position discrepancy measurement being outside of pre-set acceptable deviation criteria.

9. The method of claim 8, wherein the calculating the door position discrepancy measurement further comprises summing a plurality of the differences over time.

10. A method of operating a movable barrier opener system, the method comprising the steps of:
   a) directing a motor to move a barrier substantially along a defined travel path;
   b) sensing current drawn by the motor during the movement of the barrier substantially along the defined travel path;
   c) providing momentary reversal pulses to periodically brake the motor during the movement of the barrier substantially along the defined travel path and determining the motor shaft position associated with corresponding peaks in the current;
   d) measuring at least one of the corresponding peaks in the current;
   e) calculating a difference between the measured at least one of the corresponding peaks in the current and at least one previously measured peak in current of at least one past good run of the barrier; and
   f) directing the motor to cease movement, or cease and reverse movement, of the barrier upon the difference being outside of pre-set acceptable deviation criteria.

* * * * *